(12) United States Patent
Bryant et al.

(10) Patent No.: US 8,204,830 B2
(45) Date of Patent: *Jun. 19, 2012

(54) GLOBAL METHOD AND SYSTEM FOR PROVIDING ENHANCED TRANSACTIONAL FUNCTIONALITY THROUGH A CUSTOMER TERMINAL

(75) Inventors: Nancy Bryant, Los Angeles, CA (US); Howard A. Schechtman, Agoura Hills, CA (US); Lucilla Warren, Los Angeles, CA (US); Wigberto Yu, Los Angeles, CA (US); Netty Meiroff, Playa Del Rey, CA (US)

(73) Assignee: Citicorp Development Center, Inc., Blue Ash, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/091,296

(22) Filed: Apr. 21, 2011

(65) Prior Publication Data

US 2011/0213708 A1 Sep. 1, 2011

Related U.S. Application Data

(63) Continuation of application No. 12/683,459, filed on Jan. 7, 2010, now Pat. No. 7,953,662, which is a continuation of application No. 12/081,609, filed on Apr. 17, 2008, now Pat. No. 7,668,781, which is a continuation of application No. 09/553,449, filed on Apr. 19, 2000, now abandoned, and a continuation-in-part of application No. 09/671,424, filed on Sep. 27, 2000, now Pat. No. 8,112,330, which is a continuation-in-part of application No. 09/323,210, filed on Jun. 1, 1999, now Pat. No. 7,249,344, which is a continuation of application No. 08/908,413, filed on Aug. 7, 1997, now Pat. No. 5,933,816.

(60) Provisional application No. 60/029,209, filed on Oct. 31, 1996.

(51) Int. Cl.
*G06Q 40/00* (2012.01)

(52) U.S. Cl. ............... 705/43; 705/44; 705/35

(58) Field of Classification Search ........... 705/35, 705/43–44

See application file for complete search history.

(56) References Cited

U.S. PATENT DOCUMENTS 4,321,672 A 3/1982 Braun et al.
(Continued)

FOREIGN PATENT DOCUMENTS

EP 0955596 11/1999
(Continued)

OTHER PUBLICATIONS

"UbiQ Joins IBM, Sun, Netscape, Visa, Others in 'OpenCard' Consortium to Avance Use of Smart Cards", PR Newswire, Apr. 29, 1998.*

(Continued)

*Primary Examiner* — Narayanswamy Subramanian
(74) *Attorney, Agent, or Firm* — Eric L. Sophir; SNR Denton US LLP

(57) ABSTRACT

A global customer activated terminal (CAT) primarily serves traveling customers who require access to their accounts when they are away from their home financial institution and beyond their local regional financial area. The system provides applications that permit users to access their accounts and utilize account profiles and transaction journals within a generic global system approach, and each transaction set provides access to the user's full account profile. The traveling customer is also provided with access to all their accounts linked (as they would locally) to a specific card. The hardware employed in the system supports encryption key downloading, unscrambling and PIN encryption, so that security is instituted at the hardware level. To provide the maximum flexibility at each regional level for product and services offered, regional front end processors and Hosts are the arbitrators of each transaction acceptance and fulfillment, rather than the CAT.

21 Claims, 37 Drawing Sheets

U.S. PATENT DOCUMENTS

| | | | |
|---|---|---|---|
| 4,489,438 A | 12/1984 | Hughes | |
| 4,625,276 A | 11/1986 | Benton et al. | |
| 4,804,830 A | 2/1989 | Miyagisima et al. | |
| 4,905,186 A | 2/1990 | Fukui | |
| 5,010,238 A | 4/1991 | Kadono et al. | |
| 5,025,373 A | 6/1991 | Keyser, Jr. et al. | |
| 5,050,207 A | 9/1991 | Hitchcock | |
| 5,083,272 A | 1/1992 | Walker et al. | |
| 5,132,521 A | 7/1992 | Smith et al. | |
| 5,159,685 A | 10/1992 | Kung | |
| 5,179,700 A | 1/1993 | Aihara et al. | |
| 5,220,501 A * | 6/1993 | Lawlor et al. | 705/40 |
| 5,235,680 A | 8/1993 | Bijnagte | 395/161 |
| 5,305,200 A | 4/1994 | Hartheimer et al. | |
| 5,309,506 A | 5/1994 | Alexander | |
| 5,353,331 A | 10/1994 | Emery et al. | |
| 5,375,070 A | 12/1994 | Hershey et al. | |
| 5,453,601 A | 9/1995 | Rosen | |
| 5,463,775 A | 10/1995 | DeWitt et al. | |
| 5,465,206 A | 11/1995 | Hilt et al. | |
| 5,475,844 A | 12/1995 | Shiramizu et al. | |
| 5,485,370 A | 1/1996 | Moss et al. | |
| 5,559,313 A | 9/1996 | Claus et al. | |
| 5,559,958 A | 9/1996 | Farrand et al. | |
| 5,583,928 A | 12/1996 | Tester et al. | |
| 5,589,855 A | 12/1996 | Blumstein et al. | |
| 5,604,896 A | 2/1997 | Duxbury et al. | |
| 5,604,904 A | 2/1997 | Kini | |
| 5,606,706 A | 2/1997 | Takamoto et al. | |
| 5,616,901 A | 4/1997 | Crandall | |
| 5,651,006 A | 7/1997 | Fujino et al. | |
| 5,675,746 A | 10/1997 | Marshall | |
| 5,678,039 A | 10/1997 | Hinks et al. | |
| 5,682,482 A | 10/1997 | Burt et al. | |
| 5,699,522 A | 12/1997 | Shimizu et al. | |
| 5,710,889 A | 1/1998 | Clark et al. | |
| 5,724,503 A | 3/1998 | Kleinman et al. | |
| 5,748,896 A | 5/1998 | Daly et al. | |
| 5,761,502 A | 6/1998 | Jacobs | |
| 5,761,647 A | 6/1998 | Boushy | |
| 5,762,376 A | 6/1998 | Taskett | |
| 5,768,501 A | 6/1998 | Lewis | |
| 5,774,879 A | 6/1998 | Custy et al. | 705/35 |
| 5,784,359 A | 7/1998 | Bencheck et al. | |
| 5,787,402 A | 7/1998 | Potter et al. | |
| 5,787,403 A | 7/1998 | Randle | |
| 5,790,541 A | 8/1998 | Patrick et al. | |
| 5,793,753 A | 8/1998 | Hershey et al. | |
| 5,794,218 A | 8/1998 | Jennings et al. | 705/35 |
| 5,794,234 A | 8/1998 | Church et al. | |
| 5,819,284 A | 10/1998 | Farber et al. | |
| 5,828,840 A | 10/1998 | Cowan et al. | |
| 5,852,811 A | 12/1998 | Atkins | |
| 5,857,079 A | 1/1999 | Claus et al. | |
| 5,870,558 A | 2/1999 | Branton, Jr. et al. | |
| 5,870,561 A | 2/1999 | Jarvis et al. | |
| 5,887,139 A | 3/1999 | Madison, Jr. et al. | |
| 5,890,140 A | 3/1999 | Clark et al. | |
| 5,907,848 A | 5/1999 | Zaiken et al. | |
| 5,910,803 A | 6/1999 | Grau et al. | |
| 5,913,037 A | 6/1999 | Spofford et al. | |
| 5,920,848 A | 7/1999 | Schutzer et al. | 705/42 |
| 5,926,636 A | 7/1999 | Lam et al. | |
| 5,933,816 A * | 8/1999 | Zeanah et al. | 705/35 |
| 5,943,655 A | 8/1999 | Jacobson | |
| 5,958,009 A | 9/1999 | Friedrich et al. | |
| 5,958,010 A | 9/1999 | Agarwal et al. | |
| 5,960,200 A | 9/1999 | Eager et al. | |
| 5,961,594 A | 10/1999 | Bouvier et al. | |
| 5,974,372 A | 10/1999 | Barnes et al. | 704/8 |
| 5,983,197 A | 11/1999 | Enta | |
| 5,983,273 A * | 11/1999 | White et al. | 709/229 |
| 6,000,000 A | 12/1999 | Hawkins et al. | |
| 6,003,019 A | 12/1999 | Eaton et al. | |
| 6,012,049 A * | 1/2000 | Kawan | 705/41 |
| 6,012,050 A | 1/2000 | Eaton et al. | |
| 6,023,688 A * | 2/2000 | Ramachandran et al. | 705/44 |
| 6,026,504 A | 2/2000 | Hagiwara | |
| 6,052,711 A | 4/2000 | Gish | |
| 6,058,378 A | 5/2000 | Clark et al. | 705/37 |
| 6,061,666 A | 5/2000 | Do et al. | |
| 6,112,983 A | 9/2000 | D'Anniballe et al. | |
| 6,138,250 A | 10/2000 | Nouri et al. | |
| 6,182,052 B1 * | 1/2001 | Fulton et al. | 705/5 |
| 6,195,685 B1 | 2/2001 | Mukherjee et al. | |
| 6,226,623 B1 | 5/2001 | Schein et al. | |
| 6,236,989 B1 | 5/2001 | Mandyam et al. | |
| 6,266,709 B1 | 7/2001 | Gish | |
| 6,266,721 B1 | 7/2001 | Sheikh et al. | |
| 6,269,330 B1 | 7/2001 | Cidon et al. | |
| 6,289,320 B1 | 9/2001 | Drummond et al. | 705/35 |
| 6,289,324 B1 * | 9/2001 | Kawan | 705/41 |
| 6,308,206 B1 | 10/2001 | Singh | |
| 6,311,165 B1 | 10/2001 | Coutts et al. | |
| 6,324,658 B1 | 11/2001 | Jasperneite et al. | |
| 6,327,677 B1 | 12/2001 | Garg et al. | |
| 6,330,600 B1 | 12/2001 | Matchefts et al. | |
| 6,332,217 B1 | 12/2001 | Hastings | |
| 6,347,374 B1 | 2/2002 | Drake et al. | |
| 6,349,290 B1 | 2/2002 | Horowitz et al. | 705/35 |
| 6,349,325 B1 | 2/2002 | Newcombe et al. | |
| 6,349,333 B1 | 2/2002 | Panikatt et al. | |
| 6,370,572 B1 | 4/2002 | Lindskog et al. | |
| 6,370,586 B2 | 4/2002 | Davis et al. | |
| 6,385,644 B1 | 5/2002 | Devine et al. | |
| 6,404,743 B1 | 6/2002 | Meandzija | |
| 6,446,123 B1 | 9/2002 | Ballantine et al. | |
| 6,446,134 B1 | 9/2002 | Nakamura | |
| 6,446,218 B1 | 9/2002 | D'Souza | |
| 6,460,070 B1 | 10/2002 | Turek et al. | |
| 6,470,386 B1 | 10/2002 | Combar et al. | |
| 6,473,407 B1 | 10/2002 | Ditmer et al. | |
| 6,502,131 B1 | 12/2002 | Vaid et al. | |
| 6,502,133 B1 | 12/2002 | Baulier et al. | |
| 6,505,177 B1 | 1/2003 | Drummond et al. | 705/43 |
| 6,507,352 B1 * | 1/2003 | Cohen et al. | 715/817 |
| 6,513,019 B2 | 1/2003 | Lewis | |
| 6,513,060 B1 | 1/2003 | Nixon et al. | |
| 6,526,442 B1 | 2/2003 | Stupek, Jr. et al. | |
| 6,532,497 B1 | 3/2003 | Cromer et al. | |
| 6,535,855 B1 | 3/2003 | Cahill et al. | |
| 6,539,361 B1 | 3/2003 | Richards et al. | 705/35 |
| 6,540,135 B1 * | 4/2003 | Berstis | 235/379 |
| 6,557,122 B1 | 4/2003 | Sugauchi et al. | |
| 6,598,023 B1 | 7/2003 | Drummond et al. | 705/1 |
| 6,609,146 B1 | 8/2003 | Slotznick | |
| 6,631,409 B1 | 10/2003 | Watson et al. | |
| 6,651,090 B1 * | 11/2003 | Itabashi et al. | 709/217 |
| 6,678,826 B1 | 1/2004 | Kelly et al. | |
| 6,687,750 B1 | 2/2004 | Messinger et al. | |
| 6,704,774 B2 * | 3/2004 | Terranova | 709/219 |
| 6,718,376 B1 | 4/2004 | Chu et al. | |
| 6,796,496 B2 * | 9/2004 | Andersen et al. | 235/380 |
| 6,901,382 B1 | 5/2005 | Richards et al. | 705/35 |
| 6,963,333 B1 | 11/2005 | Drummond et al. | 345/168 |
| 6,970,845 B1 | 11/2005 | Drummond et al. | 705/43 |
| 6,973,442 B1 | 12/2005 | Drummond et al. | 705/43 |
| 6,990,466 B1 | 1/2006 | Hu | 705/35 |
| 7,024,385 B1 | 4/2006 | Adcock et al. | 705/37 |
| 7,249,344 B1 * | 7/2007 | Zeanah et al. | 717/100 |
| 7,568,615 B2 * | 8/2009 | Corona et al. | 235/379 |
| 7,647,259 B2 * | 1/2010 | de Fabrega | 705/35 |
| 7,657,473 B1 * | 2/2010 | Meffie et al. | 705/35 |
| 7,668,781 B2 * | 2/2010 | Bryant et al. | 705/43 |
| 7,689,483 B2 * | 3/2010 | Wu et al. | 705/35 |
| 7,716,096 B2 * | 5/2010 | Drummond et al. | 705/35 |
| 7,725,393 B2 * | 5/2010 | Drummond et al. | 705/43 |
| 7,835,971 B2 | 11/2010 | Stockton et al. | |
| 7,953,662 B2 * | 5/2011 | Bryant et al. | 705/43 |
| 2001/0054019 A1 | 12/2001 | de Fabrega | |
| 2003/0057271 A1 * | 3/2003 | Andersen et al. | 235/379 |
| 2003/0066876 A1 | 4/2003 | Goldman et al. | 235/379 |
| 2003/0171911 A1 | 9/2003 | Fairweather | 704/2 |
| 2003/0208440 A1 * | 11/2003 | Harada et al. | 705/39 |
| 2005/0273488 A1 | 12/2005 | Ryan et al. | 709/203 |
| 2007/0005643 A1 | 1/2007 | Korman | |
| 2007/0143398 A1 | 6/2007 | Graham | 709/204 |

| | | | |
|---|---|---|---|
| 2007/0250808 | A1 | 10/2007 | Zeanah et al. |
| 2008/0040248 | A1* | 2/2008 | Im .................................. 705/35 |
| 2008/0172443 | A1 | 7/2008 | Azulay Roger et al. ...... 709/201 |
| 2008/0235124 | A1 | 9/2008 | Bryant et al. |
| 2009/0089205 | A1* | 4/2009 | Bayne ............................. 705/38 |
| 2010/0114770 | A1 | 5/2010 | Bryant et al. |

FOREIGN PATENT DOCUMENTS

| | | |
|---|---|---|
| JP | 09-027064 | 1/1997 |
| JP | 09-298543 | 11/1997 |
| WO | WO 97/41498 | 11/1997 |
| WO | WO 98/19278 | 5/1998 |
| WO | WO 98/24041 | 6/1998 |

OTHER PUBLICATIONS

James Niccolai "Microsoft banks on DNA FS Support", InfoWorld, May 27, 1998, vol. 20, Iss 17; p. 83.*

"Industry Leaders Announce New Technology Specification to Advance Widespread Use of Smart Card Applications" Business Wire, Apr. 27, 1998.*

"ICL Launches New ATM Application, Wins IT Contract," *M2 Presswire*, Jun. 29, 1999.

"First African Carrier Joins the WorldPartners Association," *Business Wire*, May 8, 1998.

"Absolute Beginner's Guide to Networking", Second Edition, M. Gibbs et al, Chapters 1-15, Nov. 12, 1994.

Arcserve v6.5 for Windows NT User Guide, Computer Associates International, Inc., 1993-1997.

The Authoritative Dictionary of IEEE Standards Terms Seventh Edition, p. 1031-1032, published Dec. 2000.

Barthel, Matt, "7,000 ATM Sites for the Disabled? ABA Estimates Bank Renovation Needs Nationwide," American Banker, v. 156, n. 157, p. 3(1), Aug. 15, 1991.

"Bay Networks Announces Application—Optimized Network Management; Network-System and Service-Level Management Solutions Enable Optimal Application Performance and Availability," business Wire, May 26, 1998.

"BofA's Talking ATM Will Retrofit at Least 2,500 of its 14,000 ATMs With Talking ATM Technology Developed by Diebold, NCR and the California Council for the Blind," Card Fax, v. 2000, n. 51, p. 1, Mar. 15, 2000.

Business Wire "First African Carrier Joins the Worldpartners Association", May 8, 1998.

"Database Servers and Host DBMSs," 1995 Database Buyer's Guide and Client/Server Sourcebook, May 15, 1995 (p. 23 of Enclosure).

"Domain-Specific Languages versus Object-Oriented Frameworks A Financial Engineering Case Study", A, Van Deursen, 1997, whole article.

Et++SwapsManager: using Object Technology in the Financial Engineering Domain, Thomas Eggenscwiller et al, 1992, pp. 166-177.

European Search Report for Application No. EP 00 20 3320, dated Aug. 18, 2004.

European Search Report for Application No. EP 01 20 1314, dated Sep. 3, 2004 (mailing date).

Greenfield, David, "Product Spotlight: Business Layers eProvisionware," Network Magazine, NA, Jun. 1, 2000.

International Search Report for Application No. PCT/US97/18702, dated Apr. 27, 1998.

Jain, R., et al., "Network Support for Personal Information Services to PCS Users," Networks for Personal Communications Conference Proceedings, pp. 1-7, Mar. 16, 1994.

Java Perks Developer Interest from IS to Embedded Systems, Computer Design, May 1996, vol. 35, No. 6, p. 32-34.

"Lucent Selects Syndesis NetProvision Activator as Key Component of OneVision Management Systems for Network Operators," Business/Technology Editors, Business Wire, New York, Mar. 18, 1999, 1 p.

M2 Presswire "ICL Launches New ATM Application, Wins IT Contract", Jun. 29, 1999.

Microsoft Press Computer Dictionary Second Edition, p. 205-206, published Jan. 26, 1994.

"Network Management: Lucent Technologies Introduces Multi-Vendor Network Management and Services Software for Data Centric Networks (on Vision Management Systems) (Product Announcement)," Edge, on & About AT&T, Mar. 22, 1999.

"N.E.T.: New Pacific Carrier Selects N.E.T. Multiservice Network for Managed Network Services," M2Presswire, May 18, 1999.

"Principles of Object Oriented Analysis and Design", James Martin, Chapter 1-18, Published Jun. 1, 1992.

Workshop 22: OO Technology in Large Financial Institutions, Chris Laffra, ACM, pp. 213-217, 1995.

Principles of Object-Oriented Analysis and Design, James Martin, Jun. 1992, Chapter 10.

Supplementary European Search Report for Application No. EP 97 91 3679, dated Jan. 17, 2005 (mailing date).

Preliminary Examination Report for Application No. PCT/US97/18702, dated Feb. 17, 1999 (mailing date).

Written Opinion for Application No. PCT/US97/18702, dated Oct. 20, 1998 (mailing date).

Whybrow, M., "Epidemic Proportions," Banking TechnologyUK, vol. 13, No. 2, p. 20, Mar. 1996.

* cited by examiner

Support Transactions by Product Category and Functionality

Checking or Current

| Product Name | Balance Inquiry | Transaction Journal | Withdrawal | Transfer From | Transfer To | Payment From | Payment To |
|---|---|---|---|---|---|---|---|
| Checking/Current | Yes | Yes | Yes | Yes | Yes | Yes | N/A |

Savings and Investments

| Product Name | Balance Inquiry | Transaction Journal | Withdrawal | Transfer From | Transfer To | Payment From | Payment To |
|---|---|---|---|---|---|---|---|
| Savings | Yes | Yes | Yes | Yes | Yes | Yes | N/A |
| Money Market | Yes | Yes | Yes | Yes | Yes | Yes | N/A |
| Time Deposits | Yes | Yes | Yes | Yes | No | Yes | N/A |
| Other (Savings and Investments) | Yes | Yes | Yes | Yes | Yes | Yes | N/A |

Loans and Other Credit

| Product Name | Balance Inquiry | Transaction Journal | Withdrawal | Transfer From | Transfer To | Payment From | Payment To |
|---|---|---|---|---|---|---|---|
| Line of Credit | Yes | Yes | Yes | Yes | N/A | Yes | Yes |
| Mortgages | Yes | Yes | No | No | N/A | No | Yes |
| Other Loans | Yes | Yes | Yes | No | N/A | No | Yes |

Credit Cards (Linked to Debit Cards)

| Product Name | Balance Inquiry | Transaction Journal | Withdrawal | Transfer From | Transfer To | Payment From | Payment To |
|---|---|---|---|---|---|---|---|
| Visa | Yes | Yes | Yes | Yes | N/A | Yes | Yes |
| MasterCard | Yes | Yes | Yes | Yes | N/A | Yes | Yes |
| Diners Club | Yes | Yes | Yes | Yes | N/A | Yes | Yes |

FIG. 25A

Support Transactions by Product Category and Functionality (continued)

| | Credit Cards (Stand Alone) | | | | | | |
|---|---|---|---|---|---|---|---|
| Product Name | Balance Inquiry | Transaction Journal | Withdrawal | Transfer From | Transfer To | Payment From | Payment To |
| Visa | Yes | Yes | Yes | No | No | No | No |
| MasterCard | Yes | Yes | Yes | No | No | No | No |
| Diners Club | Yes | Yes | Yes | No | No | No | No |

FIG. 25B

Accounts and Balances

| | Checking or Current | | | | |
|---|---|---|---|---|---|
| Product Name | Field Name | Screen Text | Balance Inquiry | Transfer From | Transfer To | Withdrawal |
| Checking/Current | Current Balance | On Deposit/Amount You Owe | ✓ | ✓ | ✓ | ✓ |
| | Available Balance | Available Now | ✓ | ✓ | ✓ | ✓ |
| | Overdraft Used | Credit Line Used | | | | |
| | Available Credit Limit | Available Credit | ✓ | | | |
| | Credit Line Amount | Credit Line | ✓ | | | |

| | Savings and Investments | | | | |
|---|---|---|---|---|---|
| Product Name | Field Name | Screen Text | Balance Inquiry | Transfer From | Transfer To | Withdrawal |
| Savings | Current Balance | On Deposit/Amount You Owe | ✓ | ✓ | ✓ | ✓ |
| | Available Balance | Available Now | ✓ | ✓ | ✓ | ✓ |
| Money Market | Current Balance | On Deposit/Amount You Owe | ✓ | ✓ | ✓ | ✓ |
| | Available Balance | Available Now | ✓ | | | |
| Time Deposits | Principal Amount | Amount Invested | ✓ | | | |
| | Maturity Date | Maturity Date | ✓ | | | |
| | Maturity Value | Value at Maturity | ✓ | | | |
| | Product Term | Term | ✓ | | | |
| | Current Balance | On Deposit Now | ✓ | ✓ | ✓ | ✓ |
| | Available Balance | Available Now | ✓ | ✓ | ✓ | ✓ |
| Other (Savings and Investments) | Current Balance | On Deposit Now | ✓ | ✓ | ✓ | ✓ |
| | Available Balance | Available Now | ✓ | ✓ | ✓ | ✓ |

| | Loans and Other Credit | | | | |
|---|---|---|---|---|---|
| Product Name | Field Name | Screen Text | Balance Inquiry | Transfer From | Transfer To | Withdrawal |
| Line of Credit (Note: Also Used for Overdraft) | Unpaid Balance | Amount You Owe/Amount | ✓ | ✓ | ✓ | ✓ |
| | Available Credit Amount | Available Now | ✓ | ✓ | ✓ | ✓ |
| | Credit Line Amount | Credit Line | ✓ | | | |
| | Next Payment Amount | Next Payment Due | ✓ | | | |

FIG. 26A

Accounts and Balances (continued)

| Product Name | Field Name | Screen Text | Balance Inquiry | Transfer From | Transfer To | Withdrawal |
|---|---|---|---|---|---|---|
| Loans and Other Credit (continued) | | | | | | |
| Line of Credit (continued) | Next Payment Date | On <date> | ✓ | | | |
| | Last Payment Amount | Last Payment Made | ✓ | | | |
| | Last payment Date | On <date> | ✓ | | | |
| Mortgages | Principal Amount | Original Loan Amount | | | | |
| | Unpaid Principal | Amount You Owe | ✓ | | | |
| | Next Payment Amount | Next Payment Due | ✓ | | | |
| | Next Payment Date | On <date> | ✓ | | | |
| | Monthly Payment | Scheduled Payment Amount | ✓ | | | |
| | Last Payment Amount | Last Payment Made | ✓ | | | |
| | Last Payment Date | On <date> | ✓ | | | |
| | Penalty Amount | Late Charges Due | ✓ | | | |
| | Past Due Amount | Past Due Amounts | ✓ | | | |
| Other (Savings and Investments) | Principal Amount | Original Loan Amount | | | | |
| | Unpaid Balance | Amount You Owe/Amount We Owe You | ✓ | | | |
| | Next Payment Amount | Next Payment Due | ✓ | | | |
| | Next Payment Due Date | On <date> | ✓ | | | |
| | Last Payment Amount | Last Payment Made | ✓ | | | |
| | Last Payment Date | On <date> | ✓ | | | |
| | Interest Rate | Interest Rate | ✓ | | | |
| | Effective Interest Rate | A.P.R. | ✓ | | | |

| Product Name | Field Name | Screen Text | Balance Inquiry | Transfer From | Transfer To | Withdrawal |
|---|---|---|---|---|---|---|
| Loans and Other Credit | | | | | | |
| Visa/MasterCard | Current Balance (currency 1) | Amount You Owe/Amount We Owe You | ✓ | | | |

FIG. 26B

Accounts and Balances (continued)

| Credit Cards (continued) | | | | | | |
|---|---|---|---|---|---|---|
| Product Name | Field Name | Screen Text | Balance Inquiry | Transfer From | Transfer To | Withdrawal |
| Visa/MasterCard (continued) | Current Balance (currency 2) | Amount You Owe/Amount We Owe You (used for dual currency) | ✓ | | | |
| | Credit Line Amount | Credit Limit | | | | |
| | Available Credit Amount | Available Credit | ✓ | ✓ | ✓ | ✓ |
| | Cash Advance Amount | Available for Cash Advances | ✓ | ✓ | ✓ | ✓ |
| | Minimum Amount Due | Minimum Payment Due | ✓ | | | |
| | Minimum Amount Due Date | On <date> | ✓ | | | |
| | Last Statement Balance | Last Statement Balance | ✓ | | | |
| | Last Payment Amount | Last Payment Made | ✓ | | | |
| | Last Payment Date | On <date> | ✓ | | | |
| Diners Club | Current Balance (currency 1) | Amount You Owe/Amount We Owe You | ✓ | | | |
| | Current Balance (currency 2) | Amount You Owe/Amount We Owe You (used for dual currency) | ✓ | | | |
| | Credit Line Amount | Credit Limit | ✓ | | | |
| | Available Credit Amount | Available Now | ✓ | | | |
| | Cash Advance Amount | Available for Cash Advances | ✓ | | | |
| | Next Payment Amount | Total Due | ✓ | | | |
| | Next Payment Amount Date | On <date> | ✓ | | | |
| | Last Statement Balance | Balance on Last Statement | ✓ | | | |
| | Last Statement Amount | Last Payment Made | ✓ | | | |
| | Last Payment Date | On <date> | ✓ | | | |

FIG. 26C

Off-Us Balance/Print Records

| Category Name | Balance | Print |
|---|---|---|
| Checking or Savings | Current Balance | "On Deposit" |
| | Available Balance | "Available Now" |
| Credit | Available Credit Amount | "Total Credit Available" |
| | Cash Advance Amount | "Cash Advance Available" |

FIG. 27

Printed Record Balance Text Descriptors

| Checking and Current | | | | | | |
|---|---|---|---|---|---|---|
| Product Name | Field Name | Printer Record (Zero or Positive/Negative Balance) | Balance Inquiry | Transfer From | Transfer To | Withdrawal |
| Checking/Current | Current Balance | On Deposit/Amount You Owe | ✓ | ✓ | ✓ | |
| | Available Balance | Available Now | ✓ | ✓ | ✓ | ✓ |

| Savings and Investments | | | | | | |
|---|---|---|---|---|---|---|
| Product Name | Field Name | Printer Record (Zero or Positive/Negative Balance) | Balance Inquiry | Transfer From | Transfer To | Withdrawal |
| Savings | Current Balance | On Deposit/Amount You Owe | ✓ | ✓ | ✓ | |
| | Available Balance | Available Now | ✓ | ✓ | ✓ | ✓ |
| Money Market | Current Balance | On Deposit/Amount You Owe | ✓ | ✓ | ✓ | |
| | Available Balance | Available Now | ✓ | ✓ | ✓ | ✓ |
| Time Deposits | Principal Amount | Amount Invested | ✓ | | | |
| | Maturity Date | Maturity Date | ✓ | | | |
| | Current Balance | On Deposit | | ✓ | | ✓ |
| | Available Balance | Available Now | | ✓ | | ✓ |
| Other (Savings and Investments) | Current Balance | On Deposit | ✓ | ✓ | ✓ | |
| | Available Balance | Available Now | ✓ | ✓ | ✓ | ✓ |

| Loans and Other Credit | | | | | | |
|---|---|---|---|---|---|---|
| Product Name | Field Name | Printer Record (Zero or Positive/Negative Balance) | Balance Inquiry | Transfer From | Transfer To | Withdrawal |
| Line of Credit (Note: Also Used for Overdraft) | Unpaid Balance | Amount You Owe/Amount We Owe You | ✓ | ✓ | ✓ | ✓ |
| | Available Credit Amount | Available Now | ✓ | ✓ | ✓ | ✓ |
| Mortgages | Next Payment Amount | Next Payment Amount | ✓ | | | |
| | Latest Payment Amount | Last Payment Made | ✓ | | | |
| Other Loans | Next Payment Amount | Next Payment Amount | ✓ | | | |
| | Latest Payment Amount | Last Payment Made | ✓ | | | |

FIG. 28A

Printed Record Balance Text Descriptors (continued)

| Savings and Investments | | | | | |
|---|---|---|---|---|---|
| Product Name | Field Name | Printer Record (Zero or Positive/Negative Balance) | Balance Inquiry | Transfer From | Transfer To | Withdrawal |
| Visa/MasterCard | Available Credit Amount | Available Credit | ✓ | | ✓ | ✓ |
| | Cash Advance Amount | Cash Advance Available | ✓ | ✓ | ✓ | ✓ |
| Diners Club | Current Balance (currency 1) | Amount You Owe/Amount We Owe You | | ✓ | | |
| | Available Credit Amount | Available Now | ✓ | | ✓ | ✓ |
| | Cash Advance Amount | Cash Advance Available | ✓ | | | |

FIG. 28B

Transaction Journal Transaction Functions

| Available Functions | Available Functions |
|---|---|
| Deposit | Transfer To Money Market |
| Got Cash | Transfer To Time Deposit |
| Cash Advance | Transfer From |
| Credit Cash Advance | Transfer From Checking/Current |
| Check | Transfer From Savings |
| Purchase | Transfer From Money Market |
| Credit Purchase | Transfer From Time Deposit |
| Payment | Transfer From Savings/Investment |
| Payment To | Transfer From Line of Credit |
| Payment To Line of Credit | Transfer From Visa |
| Payment To Mortgage | Transfer From MasterCard |
| Payment To Loan | Transfer From Diners Club |
| Payment To Visa | Transfer From Credit |
| Payment To MasterCard | Transfer In |
| Payment To Diners Card | Transfer Out |
| Payment To Credit | Other Credit |
| Payment From | Other Debit |
| Payment From Checking/Current | Return |
| Payment From Savings | Interest Paid |
| Payment From Money Market | Interest Charged |
| Payment From Time Deposit | Interest |
| Payment From Savings/Investment | Late Payment Fee |
| Payment From Line of Credit | Service Charge |
| Payment From Visa | Finance Charge |
| Payment From MasterCard | Cash Advance Fee |
| Payment From Diners Club | Annual Fee |
| Payment From Credit | Other Fee |
| Transfer To | Profit |
| Transfer To Checking/Current | Markup |
| Transfer To Savings | Other Transaction |

FIG. 29

```
DATE              TIME          LOCATION         CARD NUMBER
31 OCT 1996       12:17         CH00705          1234XXXX896705

GOT S$100 CASH - (#110)
 GBP45:57 WAS DEDUCTED
 FROM CHECKING/CURRENT  XXXXXXXXXXXXXXXXXXX7890

NEW CHECKING/CURRENT BALANCES  XXXXXXXXXXXXXXXXXX7890
         GBP2,056.00     ON DEPOSIT
         GBP2,056.00     AVAILABLE NOW
```
1566

```
31 OCT 1996       12:17         CH00705          XXXXXXXXXX6705

GOT S$100 CASH - (#101)
 GBP45:57 WAS DEDUCTED FROM CHECKING

NEW CHECKING BALANCES
 GBP2,056.00    ON DEPOSIT
 GBP2,056.00    AVAILABLE NOW
```
1568

```
DATE              TIME          LOCATION         CARD NUMBER
31 OCT 1996       12:17         CH00705          1234XXXX896705

BALANCES - (#310)
CHECKING/CURRENT  XXXXXXXXXXXXXXXXXXXXXXXX7890
         R$25.000,57     ON DEPOSIT
         R$10.000,00     AVAILABLE NOW

BALANCE - (#303)
CREDIT
         R$5.000,00      CASH ADVANCE AVAILABLE
```
1570

```
DATE              TIME          LOCATION         CARD NUMBER
31 OCT 1996       12:17         CH00705          XXXXXXXXXX6705

BALANCES - (#301)
CHECKING
         R$25.000,57     ON DEPOSIT
         R$10.000,00     AVAILABLE NOW
BALANCE - (#303)
CREDIT
         R$5.000,00      CASH ADVANCE AVAILABLE
```
1572

```
DATE              TIME          LOCATION         CARD NUMBER
31 OCT 1996       12:17         CH00705          1234XXXX896705

DATE      DESCRIPTION                            AMOUNT
18/10     Deposit                                544.24
21/10     Trans From Time Deposit                100.00
25/10     Payment from Diners Club               500.00
25/10     Deposit                                544.24
25/10     Check 1343                             123.45
29/10     Check 1300                             700.00
29/10     Check 1344                             98.27
30/10     Interest Paid                          5.67
```
1574

FIG. 31

```
DATE              TIME              LOCATION              CARD NUMBER
31 OCT 1996       12:17             CH00705               1234XXXX896705

TRANSFER 350,000 - (#501)
  FROM CHECKING/CURRENT XXXXXXXXXXXXXXXXXXX7890
US $1,200.27 WAS CREDITED
  TO SAVINGS XXXXXXXXXXXXXX1234

NEW CHECKING/CURRENT BALANCE XXXXXXXXXXXXXXXXXX7890
       US$1,200.27    ON DEPOSIT
       US$1,400.00    AVAILABLE NOW
```
                                                                                1576

```
31 OCT 1996       12:17             CH00705               XXXXXXXXXX6705

GOT S$100 CASH - (#201)
  350,000 WAS DEDUCTED FROM CHECKING
  US$1,200.27 WAS CREDITED TO SAVINGS

NEW CHECKING BALANCE
  3,000 AVAILABLE NOW

NEW SAVINGS BALANCES
  US$1,200.27    ON DEPOSIT
  US$1,400.00    AVAILABLE NOW
```
                                                                                1578

```
DATE              TIME              LOCATION              CARD NUMBER
31 OCT 1996       12:17             CH00705               1234XXXX896705

PLEASE CALL YOUR LOCAL CUSTOMER SERVICE.
YOU MAY CALL COLLECT USING THIS PHONE NUMBER:
ARIZONA 011-99-5-212-207-2583
PLEASE GIVE THEM THE FOLLOWING NUMBER:  XXX-95QC7
```
                                                                                1580

```
DATE              TIME              LOCATION              CARD NUMBER
31 OCT 1996       12:17             CH00705               XXXXXXXX896705

PLEASE CALL YOUR LOCAL CUSTOMER SERVICE.
YOU MAY CALL COLLECT USING THIS PHONE NUMBER:
ARIZONA 011-99-5-212-207-2583
PLEASE GIVE THEM THE FOLLOWING NUMBER:  XXX-95QC7
```
                                                                                1582

FIG. 32

GLOBAL METHOD AND SYSTEM FOR PROVIDING ENHANCED TRANSACTIONAL FUNCTIONALITY THROUGH A CUSTOMER TERMINAL

CROSS-REFERENCE TO RELATED APPLICATIONS

This application is a continuation of U.S. patent application Ser. No. 12/683,459, filed Jan. 7, 2010, now U.S. Pat. No. 7,953,662 entitled "Global Method and System for Providing Enhanced Transactional Functionality Through a Customer Terminal," which is a continuation of U.S. patent application Ser. No. 12/081,609 filed Apr. 17, 2008, now U.S. Pat. No. 7,668,781 entitled "Global Method and System for Providing Enhanced Transactional Functionality Through a Customer Terminal," which is a continuation of U.S. patent application Ser. No. 09/553,449 filed Apr. 19, 2000, now abandonded entitled "Global Method and System for Providing Enhanced Transactional Functionality Through a Customer Terminal" (now abandoned) and which is also a continuation-in-part of U.S. patent application Ser. No. 09/671,424 filed Sep. 27, 2000, now U.S. Pat. No. 8,112,330 entitled "System and Method for Delivering Financial Services," which is a continuation-in-part of U.S. patent application Ser. No. 09/323,210 filed Jun. 1, 1999, entitled "System and Method for Delivering Financial Services," now U.S. Pat. No. 7,249,344 issued Jul. 24, 2007, which is a continuation of U.S. patent application Ser. No. 08/908,413 filed Aug. 7, 1997 (claiming priority to U.S. Provisional Application No. 60/029,209 filed Oct. 31, 1996), entitled "System and Method for Delivering Financial Services," now U.S. Pat. No. 5,933,816 issued Aug. 3, 1999.

FIELD OF THE INVENTION

The present invention relates to the field of customer access to banking and other transactional functions, and more specifically to a system and method for providing enhanced transactional functionality in a global financial network.

BACKGROUND OF THE INVENTION

An increasingly common problem for world travelers is access to banking and other transactions, such as stock purchases and bill payment while in other than their home countries. Many problems arise with these functions, including the need for identification information from the user to be inputted and transmitted to the local financial institution for authentication an approval by the user's home financial institution. As a result, a number of opportunities for error arise.

Another problem with international financial activities is the often close regulations of currencies by local governments, and the complications with transfers among differing currencies. These currency complications can include difficulty for the user in properly applying and verifying exchange rates.

In order to provide limited functionality, automatic teller machines (ATMs) allow access to funds in a network internationally for such functions as balance determinations, withdrawals, and fund transfers among accounts in the home country. However, these systems do not allow the user to conveniently transfer funds from an account in the home country to an account in the country the user is in or to other countries.

Another example of the present art is regional and country-specific terminals, such as customer access terminals (CATs) and personal computers, that allow banking and other transaction customers to access functions in that region or country. For example, a user in the United States accesses U.S. CAT applications. A user in Brazil accesses Brazilian CAT applications, and a user in Singapore accesses Singapore CAT applications.

However, existing systems only provide limited functions for users. Users generally can obtain only these limited balance determinations, withdrawals, and transfers, and generally, these functions may be performed only if the customer has an account with a cash balance to access. As a result, the traveling user has few functions the user can access. The user cannot perform more sophisticated functions typically available on the user's country-specific or regional CAT, such as directly buying stocks and paying bills.

Accordingly, there is a need to provide a more convenient and reliable system and method by which users can achieve a wide variety of financial, banking, and other transactional functions, particularly across international borders and in different currencies. There is a related need to enable the user to perform these functions in an easily understood manner.

SUMMARY OF THE INVENTION

In order to solve the problems with the existing art, it is an aspect of the present invention to provide a global CAT and computer banking access capability that primarily serves traveling customers who require access to accounts utilizing a CAT when away from home financial institutions and beyond the local regional financial area. It is a further aspect of the present invention to provide applications that permit users to access accounts, utilize account profiles and transaction journals, and obtain and receive a generic approach to the system globally.

It is a further aspect of the present invention to allow, where available, additional access with equal transactional functionality, for features that include balance inquiry (Get Info), withdrawal (Get Cash), transfer, transaction journal (TJ), and customer service when away from the user's home financial institution. It is a further object of the present invention to provide the traveling customer with access to all of accounts linked (as they would locally) to a specific card when they are not in their local region. It is a further object of the present invention to provide an institutional user with the capability to perform functions that include accessing a money market account to transfer a payment to a mortgage account while traveling and away from the local financial institution. It is a further object of the present invention for each transaction set to provide access to the user's full account profile.

It is a further aspect of the present invention to employ hardware that supports capabilities that include encryption key downloading, personal identification number (PIN) unscrambling, and PIN encryption so that security is instituted at the hardware level. It is a further object of the present invention to provide the functions of Account Inquiry, Withdrawal, Transfer, Customer Service, and transaction journals. It is a further object of the present invention to provide a hardware configuration that allows for subsequent addition of applications to the system as they are developed for future expansion to support new functions.

It is a further aspect of the present invention to provide the maximum flexibility at each regional level for product and services offered, regional front end processors (FEPs) and Hosts (small financial systems) as the arbitrators of each transaction acceptance and fulfillment, not the CAT. It is a further object of the present invention to provide for regional variations in the present and future without requiring changes to the CAT software or tables.

It is a further aspect of the present invention to provide customer support in a variety of languages, including English, Chinese, Dutch, French, German, Global Spanish, Greek, Italian, Japanese, Hangul, and Portuguese. It is a further object of the present invention to provide character sets for both screen displays and printing. It is a further object of the present invention to provide printed records for transactions involving withdrawal, transfer, balance inquiry, and transaction journal to support pictographic characters for screen displays in Chinese, Japanese, and Hangul.

To achieve the stated and other aspects and embodiments of the present invention, as embodied and described below, the invention includes accessing a local terminal, automatically determining the type of the local terminal, automatically identifying a user account type, automatically presenting a list of language options, the user selecting a language from the list, automatically prompting the user for an access code in the selected language, the user inputting an access code, automatically verifying the access code, if the access code is invalid, automatically terminating access, automatically providing the user with a list of transactions in the selected language, the user selecting a transaction from the list of transactions, automatically determining whether the local terminal supports the selected transaction, and, if the selected transaction is not supported by said local terminal, automatically informing the user that the transaction cannot be performed, and if the selected transaction is supported by the local terminal, automatically performing the transaction.

Additional objects, advantages and novel features of the invention are set forth in part in the description which follows, and in part will become more apparent to those skilled in the art upon examination of the following and/or upon practice of the invention described herein.

BRIEF DESCRIPTION OF THE DRAWINGS

FIG. 4 is a detailed flow diagram for the Language Selection process as part of the Product Select application for an embodiment of the present invention.

FIG. 5 is a detailed flow diagram of the message-level communication between the CAT and the front end processor (FEP) for obtaining the Card Prefix Table (CPT) in an embodiment of the present invention.

FIG. 6 is a detailed flow diagram for the Transaction Selection process as part of the Product Select application for an embodiment of the present invention. The Transaction Selection process allows the user to make selections based on the CAT type, user location, and the card type utilized.

FIG. 7 is a continuation from FIG. 4 detailing the procedures for Off-Us card types service.

FIG. 8 is a continuation from FIG. 4, outlining the procedures for no card access when the user inputs appropriate data into the system manually.

FIG. 25A and FIG. 25B present a table that illustrates the transactions supported by the system by product category and functionality. Withdrawal (Get Cash), Balance Inquiry (Get Info), Transaction Journals (TJ), and Transfer/Payment capabilities are indicated.

FIG. 26A, FIG. 26B, and FIG. 26C contain a table that represents the screens displayed by the system for Balance Inquiry (Get Info), Withdrawal (Get Cash), and Transferring currency for On-Us card class types.

FIG. 27 presents a table that represents the screens displayed and record printed by the system for Off-Us card class types.

FIG. 28A and FIG. 28B contain a table that illustrates the printed records supported by the system by product category and functionality. Withdrawal (Get Cash), Balance Inquiry (Get Info), and Transfer/Payment capabilities are indicated.

FIG. 29 is a table that describes the types of transaction journal inquiries that may be performed by the system where available.

FIG. 31 is a representation of five printed records for Withdrawal On-Us Debit and Credit Cards, Withdrawal Off-Us Card Classes, Balance Inquiry record for On-Us Debit and Credit Cards, Balance Inquiry record for Off Us Card Classes, and Transaction Journal record for On-Us Debit and Credit Cards.

FIG. 32 presents a representation of four printed records for Transfer On-Us Debit and Credit Cards, Transfer Off-Us Card Classes, Customer Service for On-Us Debit and Credit Cards, and Customer Service for Off Us Card Classes.

DETAILED DESCRIPTION

An embodiment of the present invention provides global CAT and computer banking access capability that primarily serves traveling customers who require access to accounts utilizing a CAT when away from home financial institutions and beyond the local regional financial area. The present invention provides applications that permit users to access accounts, utilize account profiles and transaction journals, and obtain and receive a generic approach to the present invention globally.

The present invention allows, where available, additional access with equal transactional functionality for such functions as balance inquiry (Get Info), withdrawal (Get Cash), transfer, transaction journal (TJ), and customer service when away from the user's home financial institution. The present invention provides the traveling customer with access to all of accounts linked (as they would locally) to a specific card when they are not in their local region. Further, an institutional user may perform such functions as accessing a money market account to transfer a payment to a mortgage account while traveling and away from the local financial institution. Each transaction set provides access to the user's full account profile.

The hardware employed in an embodiment of the present invention also supports such capabilities as encryption key downloading, personal identification number (PIN) unscrambling, and PIN encryption so that security is instituted at the hardware level. Services provided in an embodiment of the present invention include Account Inquiry, Withdrawal, Transfer, Customer Service, and transaction journals. The hardware configuration allows for subsequent addition of applications as they are developed for future expansion to support new functions.

In an embodiment of the present invention, to provide the maximum flexibility at each regional level for product and services offered, regional front end processors (FEPs) and Hosts (small financial systems) are the arbitrators of each transaction acceptance and fulfillment, not the CAT. This allows for regional variations in the present and future without requiring changes to the CAT software or tables.

This global application of the present invention provides customer support in a variety of languages, including English, Chinese, Dutch, French, German, Global Spanish, Greek, Italian, Japanese, Hangul, and Portuguese. The present invention also provides character sets for both screen displays and printing. Printed records are available for transactions involving withdrawal, transfer, balance inquiry, and transaction journal. Additionally, pictographic characters are supported for screen displays in Chinese, Japanese, and Hangul.

References will now be made in detail to an embodiment of the present invention, an example of which is illustrated in the accompanying drawings.

Figure 1A:
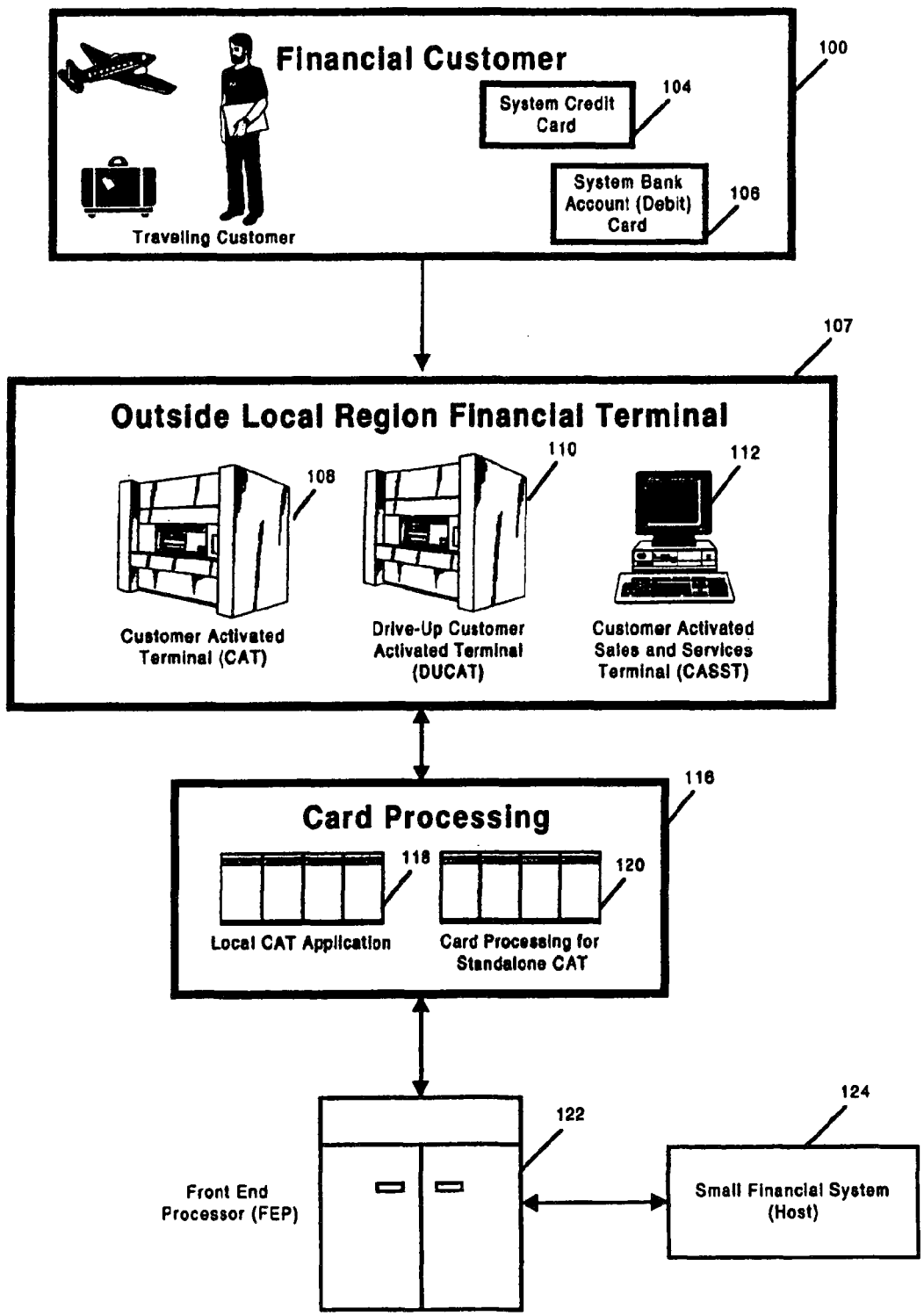
FIG. 1A and FIG. 1B present overview block diagrams of the integrated components and relationships that comprise the global customer activated terminal (CAT) access system for financial services as described by an embodiment of the present invention.

FIG. 1A is a block diagram which generally illustrates various manners by which a traveling customer 102 gains access to a financial system in accordance with an embodiment of the present invention. The traveling customer 102 utilizes a system credit card 104 (for example, a card issued by Visa, MasterCard, or Diners Club) or a debit card (bankcard) 106 to access the system.

Block 107 illustrates various financial terminals located outside the customer's local region through which the traveling customer 102 accesses the system. In this example, these financial terminals include a customer activated terminal (CAT) 108, a drive-up CAT (DUCAT) 110, and a customer activated sales and services terminal (CASST) 112. In an embodiment of the present invention, the CAT 108 and DUCAT 110 incorporate a card reader, display, and keypad within a single housing.

While specific terminals are illustrated in FIG. 1 and throughout this application using the nomenclature "customer activated terminal" or "CAT," it will be understood that many other financial terminals may also be used, and that equivalent terminals may be referred to with different terminology. Specifically, in the present context, the terminals shown in block 107 may also include those terminals commonly referred to as "automated teller machines" (ATMs).

In an embodiment of the present invention, once an interface with a terminal is activated and the user selects the type of transaction desired according to techniques known in the art, a message is sent to card processing 116 as part of the local terminal. The information from the card is handled by either a local terminal application 118, when available, or is handled by a standalone terminal application 120.

Once card processing is completed, a request is sent to a front end processor 122 (FEP) for specific information that is dependent on the transaction. In this example, the FEP is a system in which all the terminals in a particular business region are connected. The FEP transmits service provider information from a small financial system or host 124 to the particular terminal application 118 or 120 utilized by the customer. In cases where the customer's account is with another business or institution, the FEP serves as a switch to route requests to outside the business network.

Figure 1B:
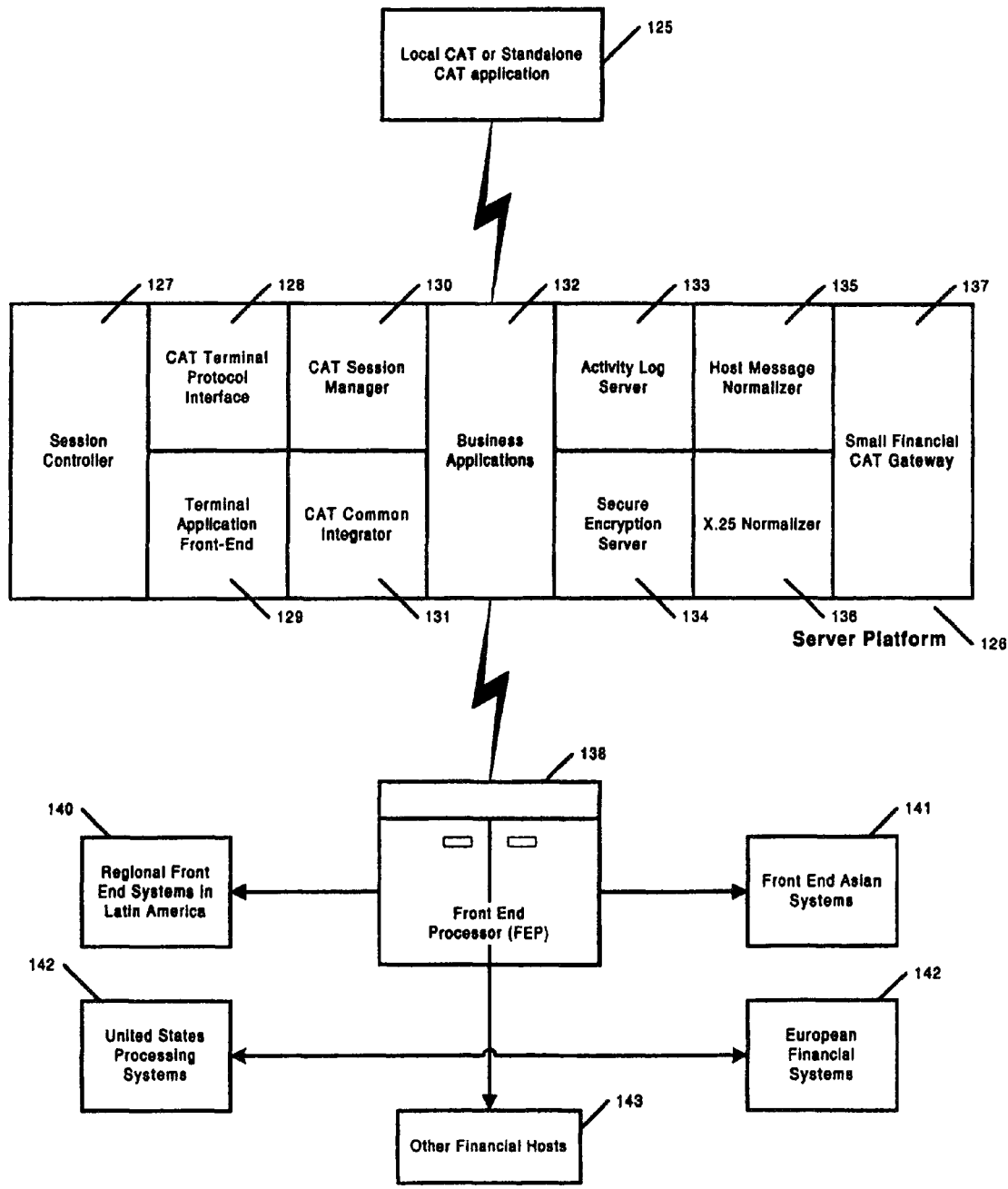

FIG. 1B presents a block diagram describing in greater detail the interaction among a local CAT application 125 and the various components of a server platform 126 and an FEP 138. In this example, when a transaction is initiated outside of a local regional financial center (for example, when a customer is traveling abroad), the local terminal application 125 that is accessed by the customer initiates the global application according to the present invention. Specifically, a message is sent to the host or FEP 138 to request a decision on whether to proceed with the transaction. Accepting or denying transactions at the host or FEP 138 rather than at the local CAT permits regional variations without requiring changes to the CAT software or tables.

Connection to the FEP or host 138 is managed by the server platform 126. The components of the server platform include: a session controller (SC) 127; a CAT terminal protocol interface (CAT-TPI) 128; a terminal application front-end (TAFE) 129; a CAT session manager (CAT-SM) 130; a CAT common integrator (CAT-CI) 131; business applications 132; an activity log server (ALS) 133; a secure encryption server (SES) 134; a host message normalizer (HMN) 135; a small financial CAT gateway (SF/SFC) 137; and an X.25 normalizer (X25.-NI) 136.

The session controller 127 functions include: support for a mechanism to start up a configurable number of static triplets based on the type of client they must service; support for a set of executable arguments that are unique to the trio of processes associated with each transaction session; support for a pool of terminal IDs that have been assigned to the server by the business; and support for exchanging session-initiation (SI) and session-termination (ST) messages with the CAT-SM.

The CAT terminal protocol interface 128 is the software in direct contact with the application, whether it is running in a terminal or at the Host. It provides services to establish and maintain the link level connection with terminals. It also translates between protocols, manages the link level message flow control, generates the encryption key, encrypts/decrypts, and performs special services as required by individual interfaces.

The terminal application front-end 129 serves as the run-time interpreter that executes business applications on the server and provides a set of APIs used by the interpreter to perform system functions.

The CAT session manager 130 is the intelligence of the session, representing the interests of the business applications 132, and communicating with both the terminal interface and the integrator. Its functional responsibilities include enforcing the business rules of the interface, verifying customer identity and enforcing security safeguards, establishing and maintaining the session context, monitoring and enhancing messages, providing flow control for list processing between the global system and the application, and managing the activity log recording.

The CAT common integrator 131 applies message level rules required to format messages correctly when communicating with different business Hosts.

The activity log server (ALS) 133 provides support for CAT application-generated transaction logs. Existing transaction logs are written to disk files. The message-level interface to the ALS supports a unique transaction type (e.g., function code) for each log.

The Secure Encryption Server (SES) 134 supports encryption key downloading, PIN unscrambling and PIN encryption.

The SFC Gateway 135 serves as a link level protocol converter. It has an external interface to a "Small Financial Services" (SFS) Host and internal interface to an MCS "Common Integrator" (CI) process in support of application messages. It also has an internal interface to the MCS Local Network Control Facility (LNCF) to support network control of the gateway. Application message level text is transparent to the SFC Gateway.

The SFC Gateway is used to transfer application messages between CAT Common Integrator and the external Hosts utilizing the Host Message Normalizer 135. Financial application messages are transferred between CAT applications, and the external Hosts. Network control application messages are transferred between a Host and a node resident LNCF. The SFC Gateway is bi-directional allowing request messages to be initiated by either the external or internal side.

The X.25 Normalizer (X25.-NI) 136 serves to keep the gateway independent of the link-level protocol.

CAT sessions are "pre-started" at system initialization time, and the trio of processes (CAT-TPI, TAFE, CAT-SM) that service a CAT session are considered static; that is, they are started before the Client attempts to connect to the system. The pre-start is necessary for optional performance.

The trio of processes (i.e., triplet CAT-TPI, TAFE, CAT-SM) that service each session remain active until the system is reinitialized (rebooted). At the end of a session, the triplets take the necessary steps to "clean up" the current session, reinitializing session state and data context in preparation for servicing another client. A session is typically terminated in one of three ways: 1) application initiated—for example, the customer presses the cancel button on an application screen; 2) client initiated—for example, the disconnect packet is sent at the link level (this occurs when the customer selects exit from a local menu); or 3) CAT-TPI initiated—for example, the line is dropped or some other communication error occurs. If one of the triplets fails due to a fatal error (e.g., memory allocation), the entire group is restarted by the Server Controller.

Figure 2:
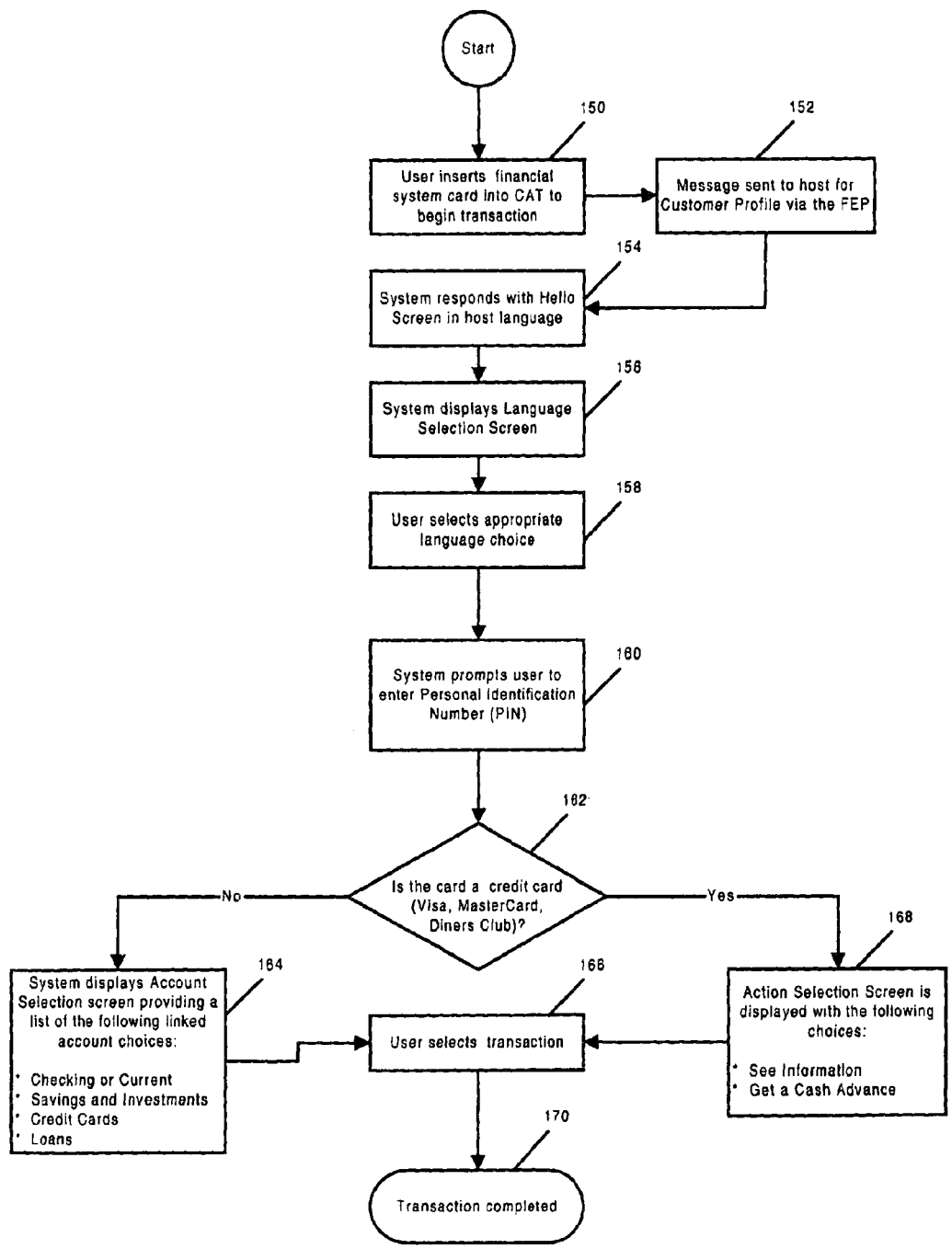
FIG. 2 is a general overview of the transaction process, comprising the major steps undertaken by the system to initiate and complete a transaction.

An exemplary system design for an embodiment of the present invention is illustrated in FIG. 2. An institutional user inserts a card to the local CAT to begin the transaction 150. The message from the local CAT is sent to the host or small financial system via the FEP for the customer profile information 152. The local CAT awaits the customer profile before responding with the Hello Screen in the host language 154. The system then displays the Language Selection screen 156, allowing the user to select a language from the available choices 158. The system prompts the user to enter his or her Personal Identification Number (PIN) for security purposes 160. If the PIN is correct, the system determines if the information obtained from the user is a credit card or a debit account card 162. If the card is a credit card, the screen displays choices allowing the user to perform a balance inquiry (See Information) or obtain a withdrawal (Get a Cash Advance) 168. If the card is a debit account card, then the system displays information providing a list of linked account choices, such as checking or current accounts, savings and investments, credit cards (linked) or loans 164. Once the user selects the transaction, a message is transmitted to the FEP for authorization 166. Once the authorization is completed and properly inputted and logged, the transaction is completed and the card is returned to the user 170.

Figure 3:
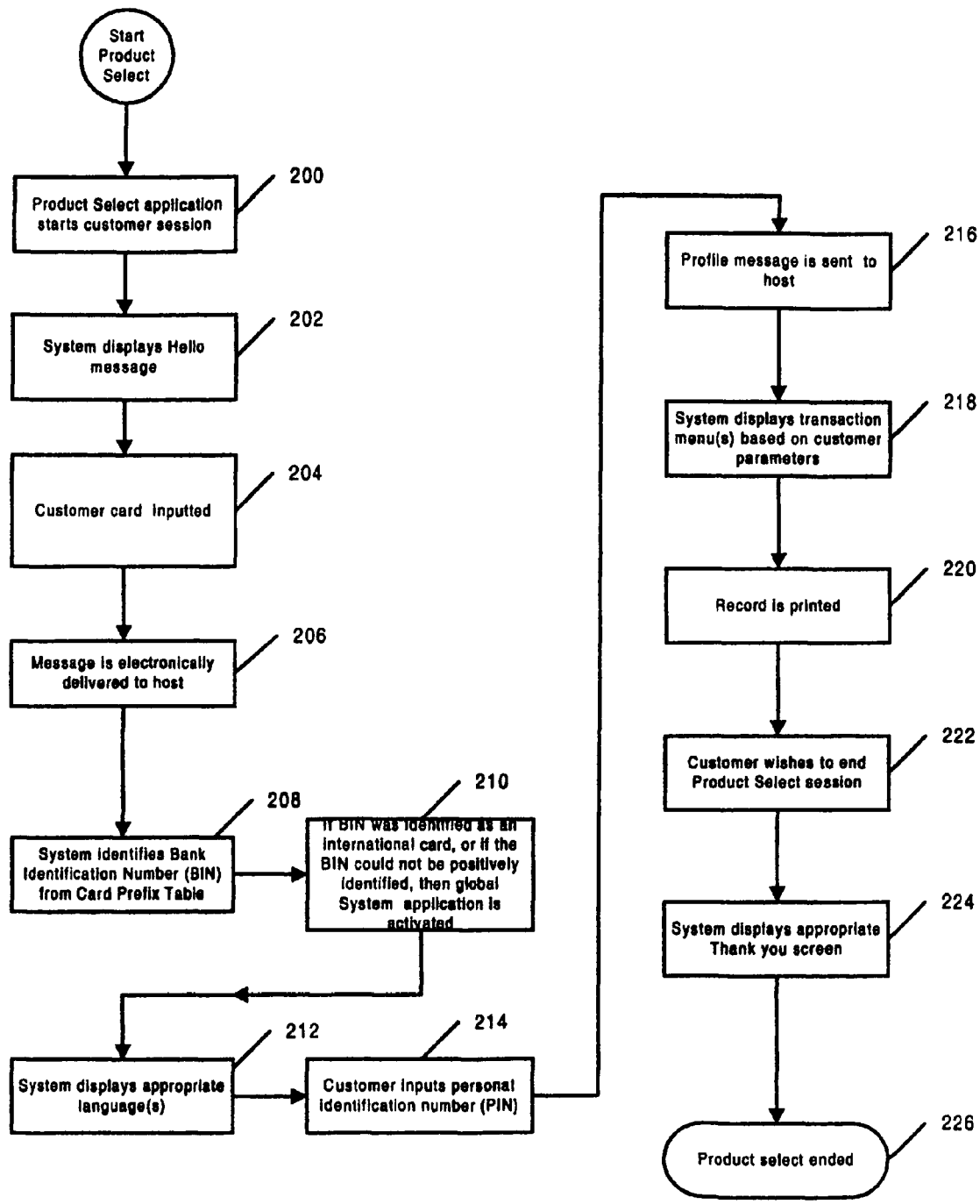
FIG. 3 is a general overview of the Product Select application.

Product Select is a first system application that starts a session allowing the user to perform a transaction. FIG. 3 provides an overview of the entire Product Select application. The Product Select application is initiated and starts the user session 200, with the system displaying the "Hello" message at the local CAT 202. The user inputs a card or card number into the system 204, which initiates the system to send a message electronically to the host via the FEP 206. The system identifies the Bank Identification Number (BIN) 208, and if the BIN from the card is identified as an international bank card, or if the BIN could not be positively identified, then applications of the global system become active 210. The system displays the appropriate languages(s) for selection 212, and the user inputs their personal identification number (PIN) 214.

Once the PIN is verified, the profile message is sent by the host to the local CAT via the FEP 216, allowing the local CAT to display the transaction menu based on the user parameters 218. Once the user selects a transaction and the process is completed, a record is printed where available 220. Prior to ending the Product Select session 222, then the system displays the appropriate "Thank You" screen 224, and the Product Select session is ended with the application terminated 226.

Figure 4:
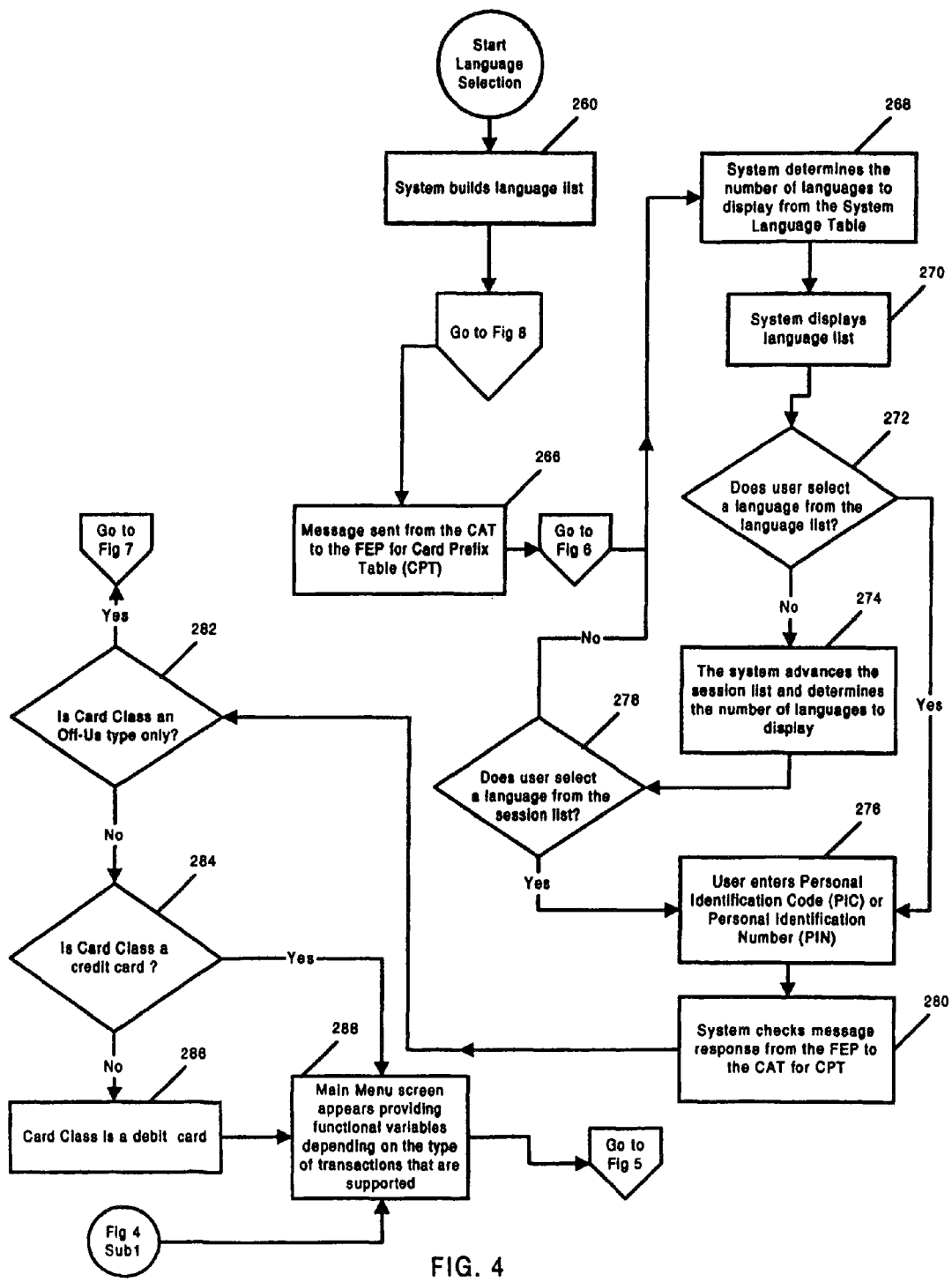
FIGS. 4 through 8 provide a more detailed examination of the Product Select application.
Figure 30:
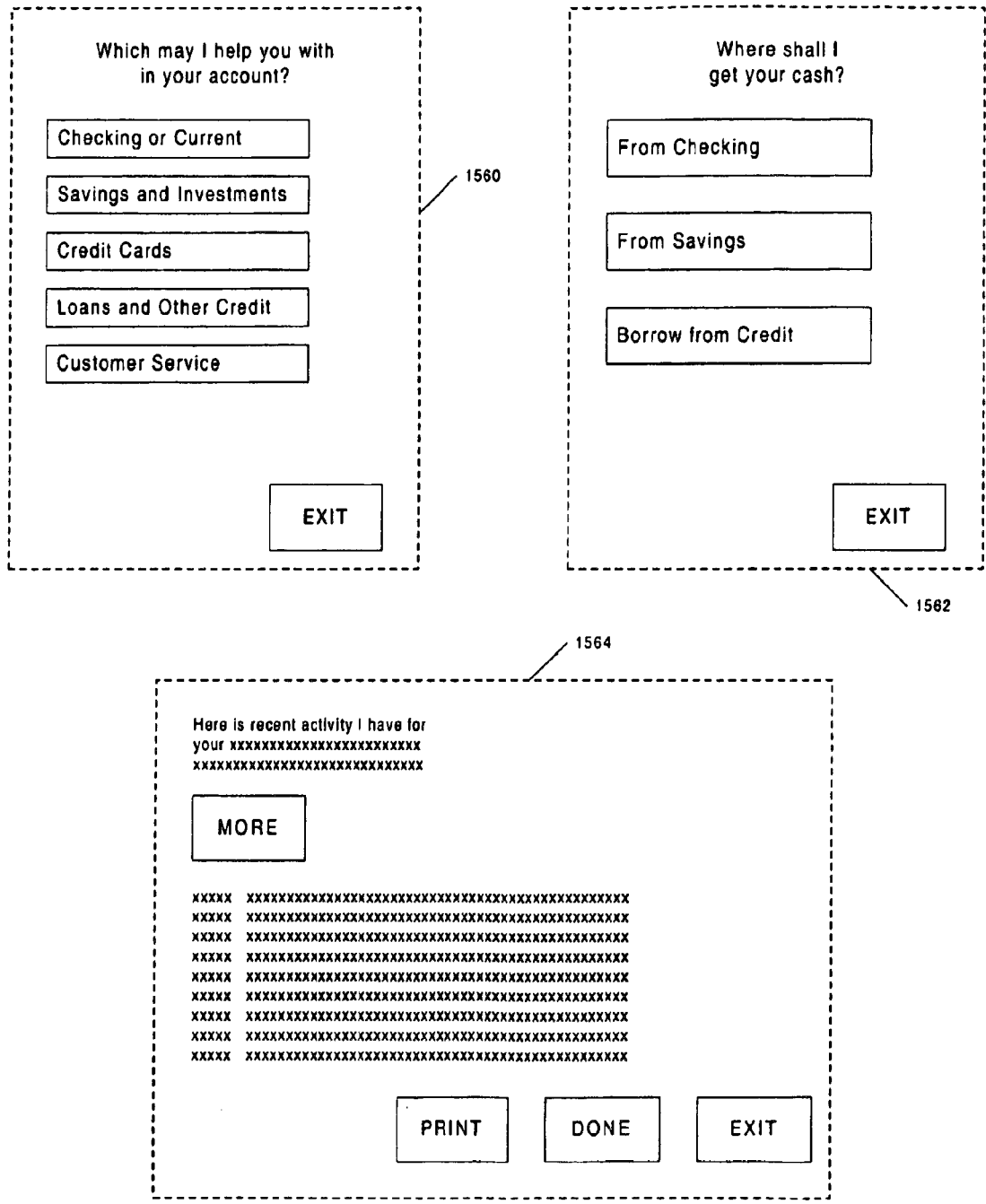
FIG. 30 is a representation of the appearance of three screens illustrating the Main Menu, the Withdrawal Main Menu, and the Transaction Journal Menu.

A Language Selection process for the Product Select application is shown in FIG. 4. The system builds a language list 260 for the user to choose from based on the user's parameters and the capabilities of the local CAT. A message is sent from the CAT to the FEP for the Card Prefix Table (CPT) 266. The system determines the number of languages to display from the System Language Table 268 and then displays the list from which the user chooses 270. If the user selects a language from the displayed language list 272, then the system prompts the user to enter a Personal Identification Code (PIC) or PIN 276. If the user does not choose a language from the list 272, the system advances the session list and determines the number of languages to display 274; it then allows the user to select a language from the session list 278. Once the user enters their PIC or PIN, then the system checks the message response from the FEP to the CAT for the CPT 280. After a positive response is received, the system determines if the Card Class is an "Off-Us" (a card is so designated under the method and system of the present invention if it is not issued or specially designated as "On-Us," which is described below, by the institution to receive selected services as provided by the present invention) type 282. If it is not, then the system determines if the Card Class is a credit card 284. If it is not then the card is a debit card 286. Whether the card class is a credit or debit card, the system displays the Main Menu screen providing functional variables dependent on the type of transactions supported 288. FIG. 30 1560 provides a representation of one of the types of Main Menu screens utilized by the system.

Figure 5:
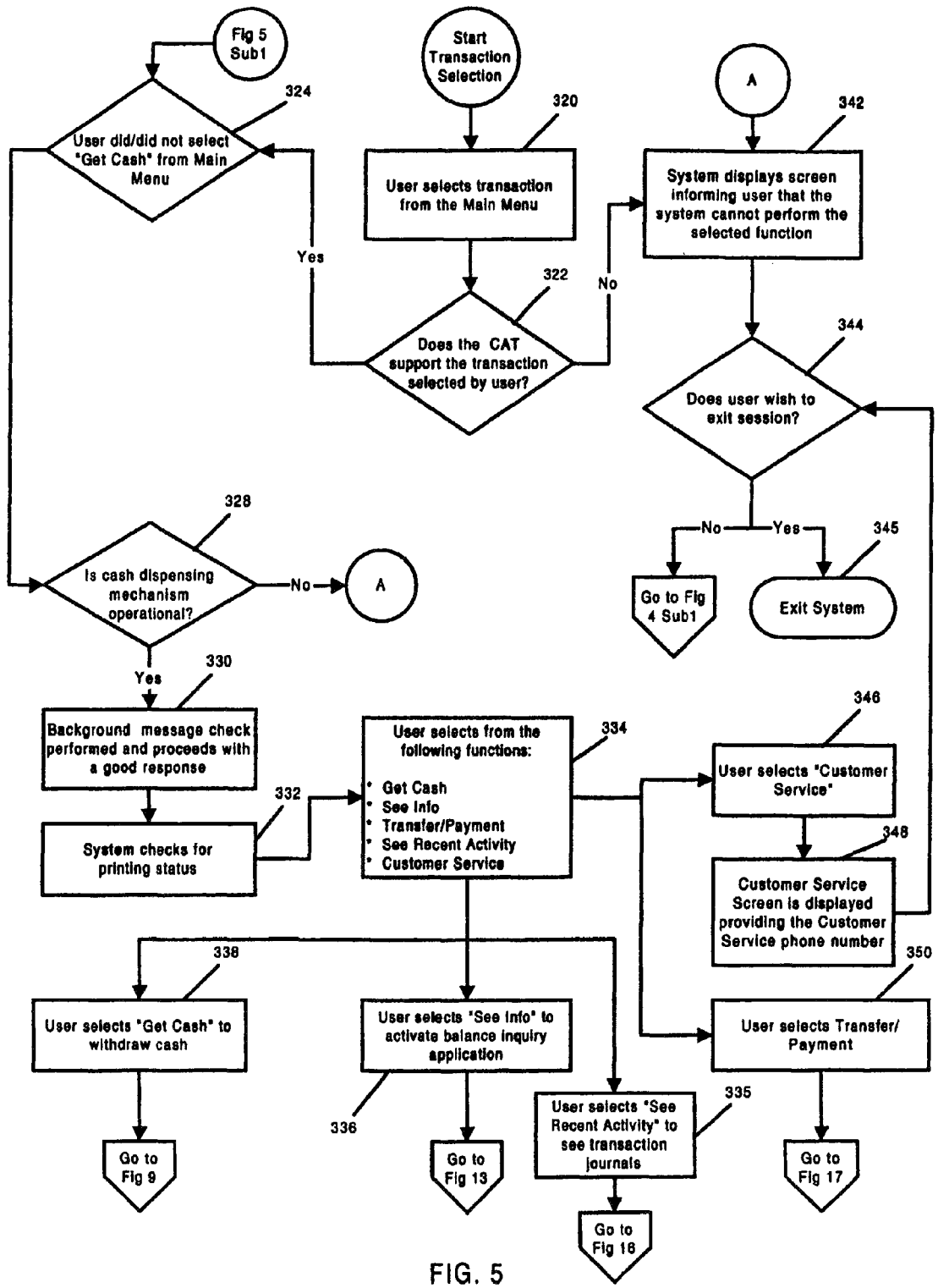

From the Main Menu, the user may initiate a transaction by selecting one of the choices offered. The process is diagrammed on FIG. 5. The user selects a transaction (e.g., checking, savings, credit cards) from the Main Menu screen 320. If the transaction selection is not supported 322, then the system displays a screen informing the user that the system cannot perform the selected function at this time 342. The system prompts the user 344 to return to the Main Menu or to exit the system 345.

If the CAT supports the transaction selected by the user 322, whether or not the user selected "Get Cash" (withdrawal) from the Transaction Main Menu 324 (see FIG. 30 1562), then the system determines if the cash dispensing mechanism is operational 328. If the cash dispensing machine is not operational, then the system displays a screen informing the user that the system cannot perform the selected function. If the cash dispensing machine is operational, then the system performs a background message check and proceeds to the next step with a good response 330. The system checks the status of the printer 332 and then displays on the screen a submenu for the user to select Get Cash, See Info, Transfer/Payment, See Recent Activity, or Customer Service 334. The user selects Get Cash to withdraw cash 338, selects See Info to activate the balance inquiry application 336, selects See Recent Activity to see transaction journals 335, selects Transfer/Payment to activate the transfer application 350, or selects Customer Service 346 to display the Customer Service Screen providing the Customer Service phone number 348. After the user views the Customer Service Screen for the information requested, the system then prompts the user 344 to select to return to the Main Menu or to select to exit the system 345.

Figure 6:
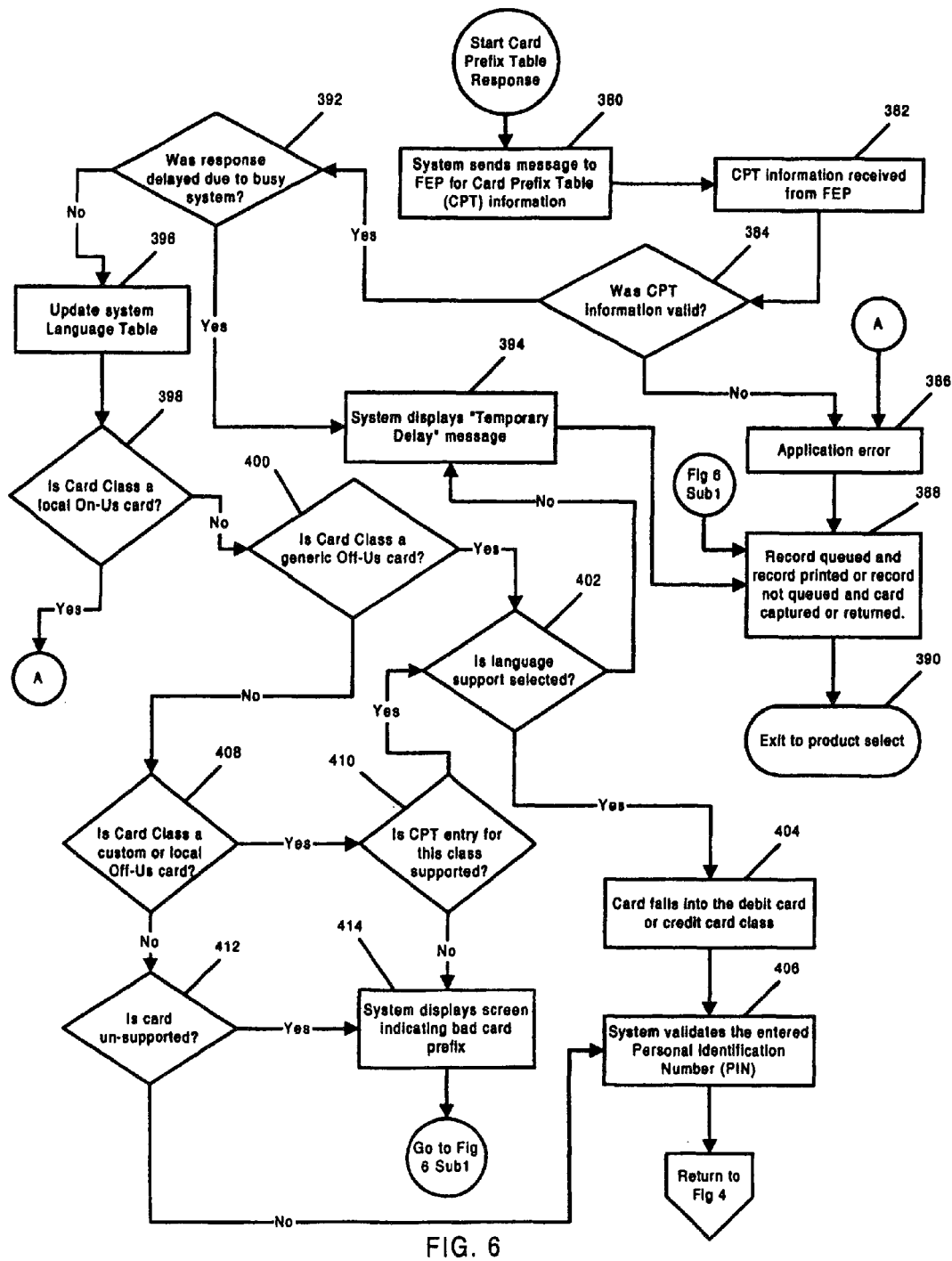

When the system runs a Product Select application, the system sends a message to the FEP for the Card Prefix Table (CPT) information 380 as diagrammed in FIG. 6. Once the CPT is received at the CAT from the FEP 382, then the system determines if the CPT information is valid 384. If the information is not valid, then a CPT application error occurs 386 and the record is queued with record printed or the record is not queued and the card is captured or returned 388. The system then returns to the beginning of Product Select 390.

When the CPT information is valid 384, then the system checks for a delay response 392, and if none has occurred, then the system updates the Language Table 396. If there was a delayed response due to the system activity, then the system displays a message indicating a temporary delay 394, in which case the system queues the record 388 if the delay is excessive.

Once the Language Table is updated, the system determines if the Card Class is a local "On-Us" (a card so designed under the system and method of the present invention to receive selected services provided by the present invention) card type 398. If the card type is a local On-Us card type, an application error occurs due to the fact that the global system is not used for CAT applications involving local card types. If the Card Class is a generic Off-Us card, 400, then the system determines if the language support has been selected or determined 402. A generic Off-Us card is a financial card not provided by the system financial institution. If language support can be selected, then the card type is the debit or credit card class 404. Once the user inputs a PIN, the system validates the entered PIN 406 and the system proceeds with Product Select.

When the card class is not a local On-Us or generic Off-Us card, then the card may be a custom or local Off-Us card 408, in which case, it is determined if the CPT entry for this card class is supported 410. When the CPT entry is not supported, or when the card is unsupported 412, then the system displays a screen indicating a bad card prefix 414.

Figure 7:
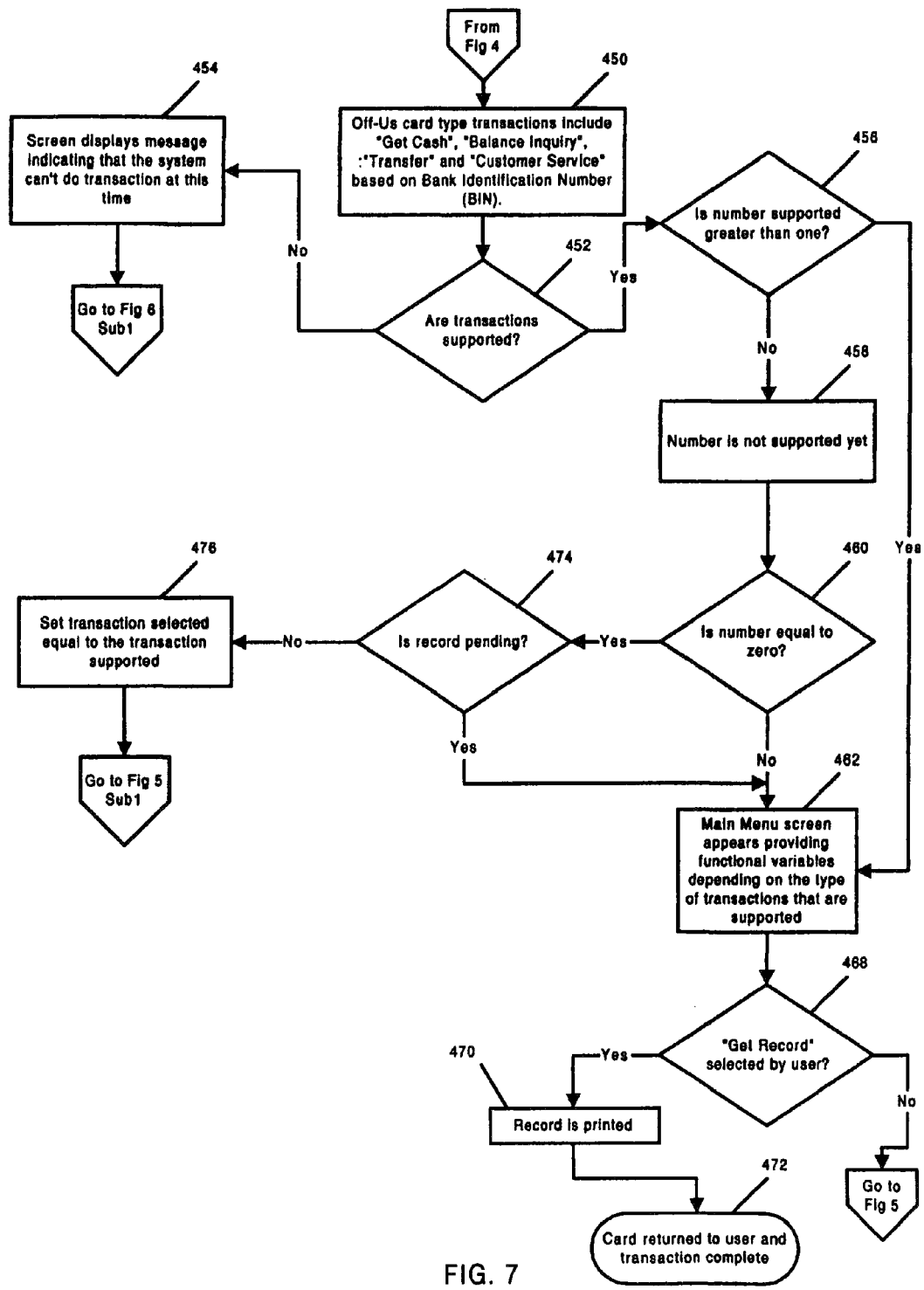

Off-Us card class card types are processed in Product Select as diagrammed in FIG. 7. Off-Us card types transactions are limited to Get Cash (withdrawal), Balance Inquiry, Transfer, and Customer Service based on the Bank Identification Number (BIN) 450. Once the user selects an application 452, the system determines if that transaction is supported. If the system determines that the transaction is not supported, then the screen displays a message indicating that the system cannot perform the transaction at this time 454 and the record is queued with record printed or the record is not queued and the card is captured or returned. The system returns to the beginning of Product Select.

When the transaction is supported, the system returns the number of transactions supported 456, and if the number is one or zero, then the number is not yet supported 458. If the number is zero 460, and if a record is not pending 474, then the system sets the selected transaction equal to the transaction supported 476 and the transaction proceeds as described on FIG. 5 (324). If the number returned is not zero or is greater than one, then the Main Menu screen appears providing functional variables depending on the type of transactions that are supported 462. Once the user competes the transaction, the user may select the Get Record function 468 to print a record 470, and the card is returned to the user, at which time the transaction is complete 472. If the user does not select the Get Record function, then the system is prompted to return to the transaction selection process.

Figure 8:
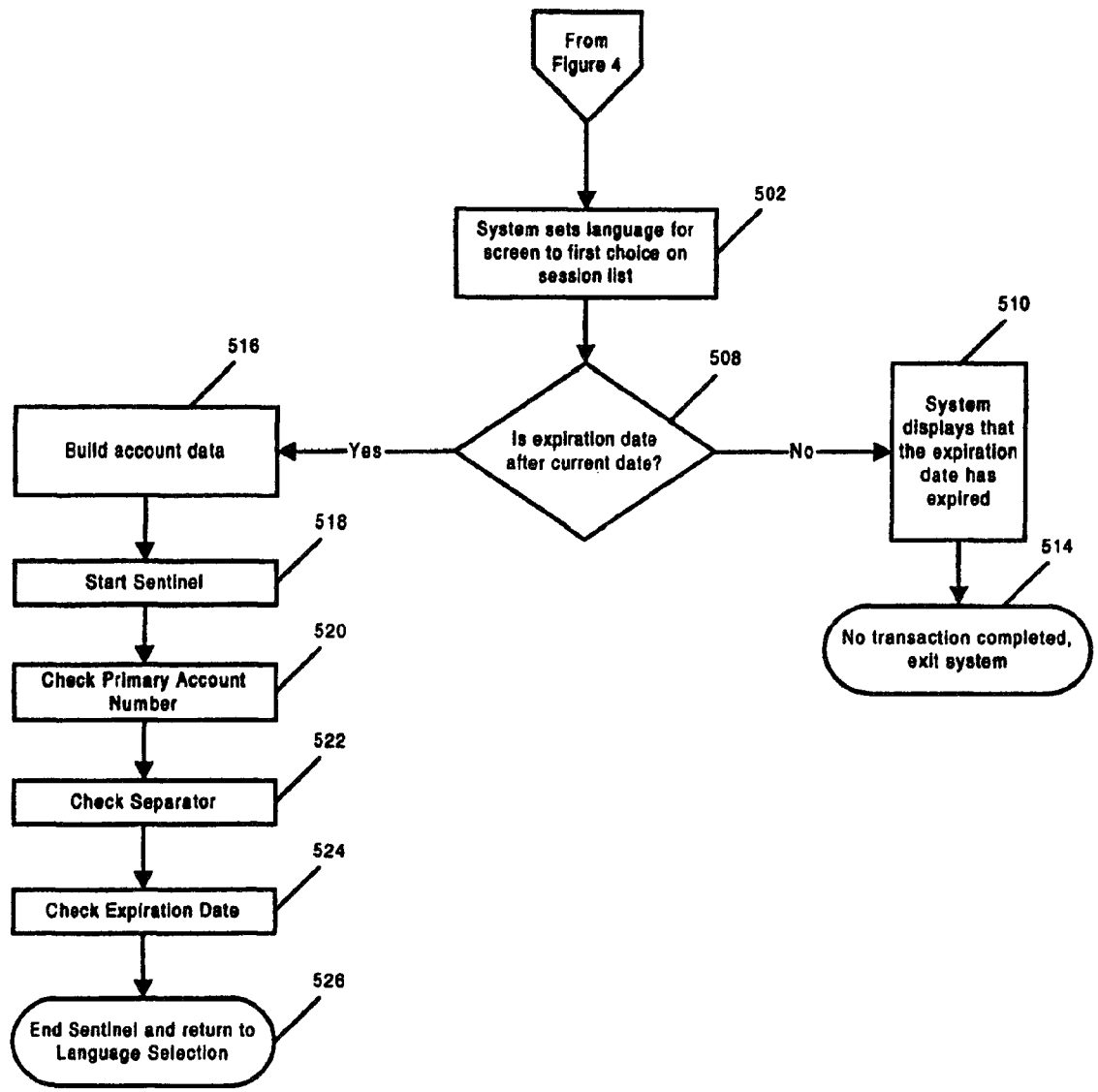

For security purpose, the system may also verify the expiration date of the card, as described in FIG. 4 and FIG. 8. As shown in FIG. 8, the system initially sets the language for the screen to the first choice on the language session list 502. The system then checks if the expiration date is after the current date 508. If it is not, then the system displays a message that the card has expired 510. If the card has expired, then no transaction is recorded and the user exits the system 514.

When the expiration date is after the current date 508, then the system builds the account data 516 and the system starts the Sentinel 518 process, which prohibits the unauthorized entry into the system. The Sentinel process checks the primary account number 520, and checks the separator 522 and the expiration date 524 before allowing the user to proceed to the Language Selection process of Product Select 526.

Figure 9:
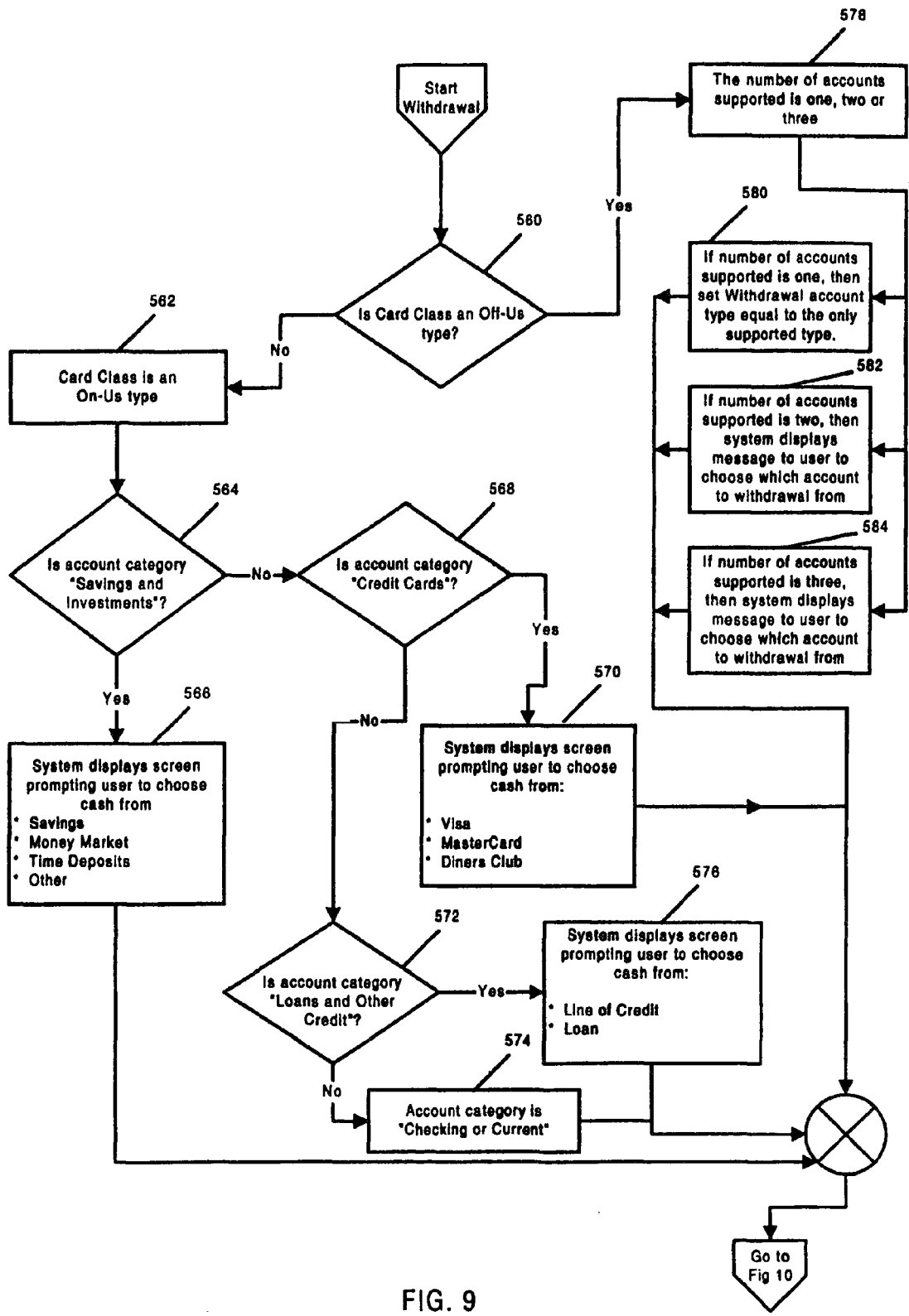
FIG. 9 is a flow diagram outlining the beginning of the Withdrawal (Get Cash) application of an embodiment of the present invention. It describes the initial menu choices for the user.

FIG. 9 depicts the card identification and user selection of the account from which the withdrawal is made. The user begins a withdrawal with the system identifying whether or not the card class is an Off-Us type 560. If the card is an Off-Us type, the system determines the number of accounts linked to the card 578. If the card supports one account, the withdrawal information is set to the single account 580. If the card supports two or three accounts, the system displays a message to the user to choose from which account to make the withdrawal 582, 584.

If the card class is not determined to be an Off-Us type 560, then it is an On-Us type 562. The system then determines the account category. If the card identifies the account category as "Savings and Investments" 564, the system displays a screen. If the category is "Credit Cards" 568, the system displays screens prompting the user to choose cash from a variety of credit cards linked to the account 570. If the account is "Loans and Other Credit" 572, the system prompts the user to choose the credit line to withdrawal funds 576. If the account is not any of the above mentioned, the account category is "Checking or Current" 574.

Figure 10:
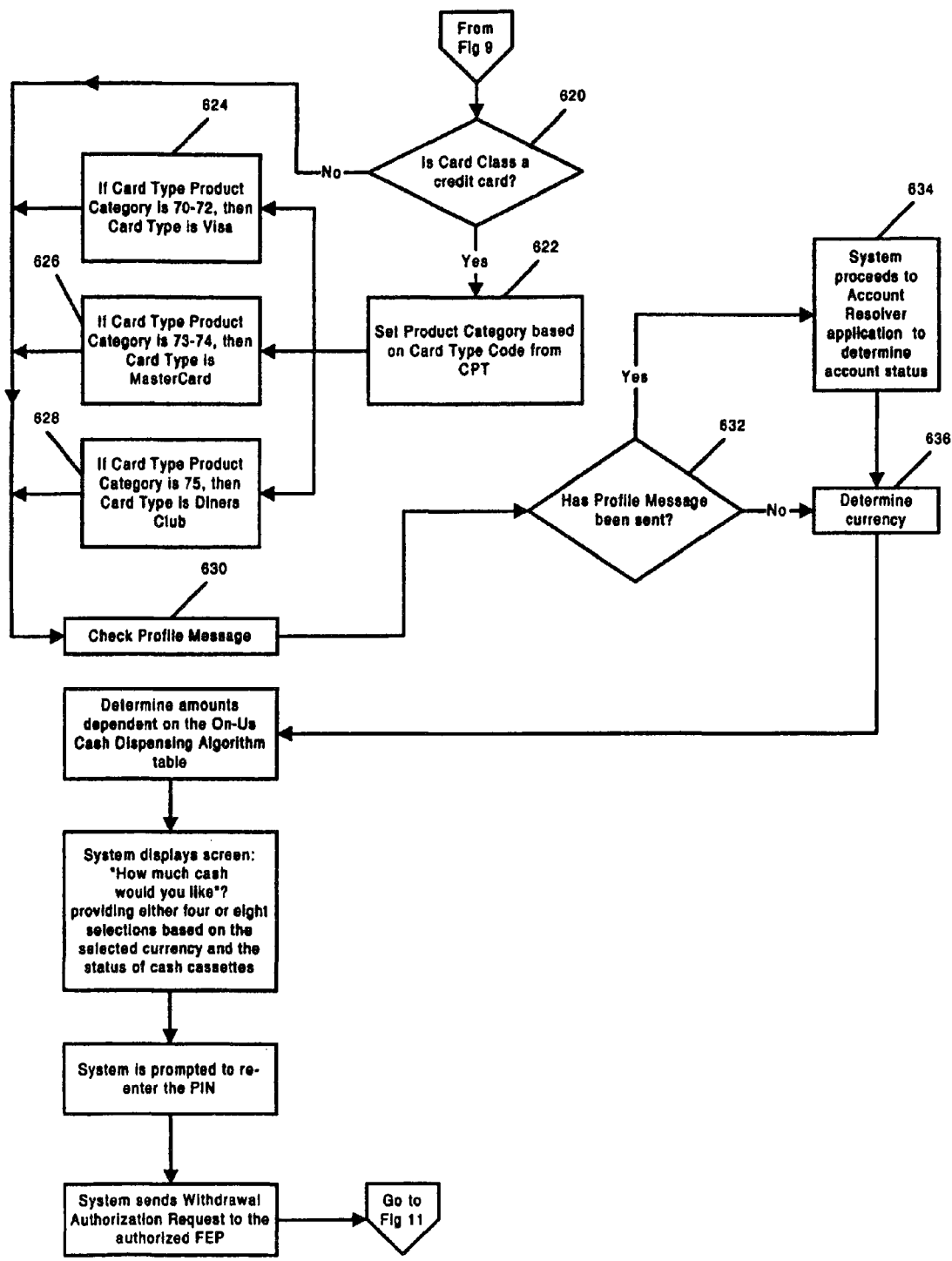
FIG. 10 is a continuation of FIG. 9, outlining the different procedures for different types of card classes.

FIG. 10 continues with the identification of the user's type of card and the type of customer activated terminal in use. The system identifies whether or not the card class is a credit card 620. If the card is not a credit card, the system checks the profile message 630. If the card is a credit card, the system identifies the card by its card type product category 622. If the card type product category is 70 to 72 then the card is identified as Visa 624 and the system continues checking the profile message 630. If the card type product category is 73 to 74 then the card is identified as MasterCard 626 and the system continues checking the profile message 630. If the card type product category is 75 then the card is identified as Diners Club 628 and the system continues checking the profile message 630.

The system then determines if the profile message has been sent 632. If the profile message has not been sent, the system determines the currency 636 and continues the process as described in FIG. 12. If the profile message has been sent, the system proceeds to the Account Resolver module to determine the account status (FIG. 10) 634, prior to determining the currency 636.

The system determines the amount available for withdrawal based on the On-Us Cash Dispensing Algorithm Table 648. Then it displays a dialog box requesting the user to choose between either four or eight selections from the selected currency, depending on the status of the cash cassettes 650. The user selects the amount, and is prompted for a personal identification number 652.

Figure 11:
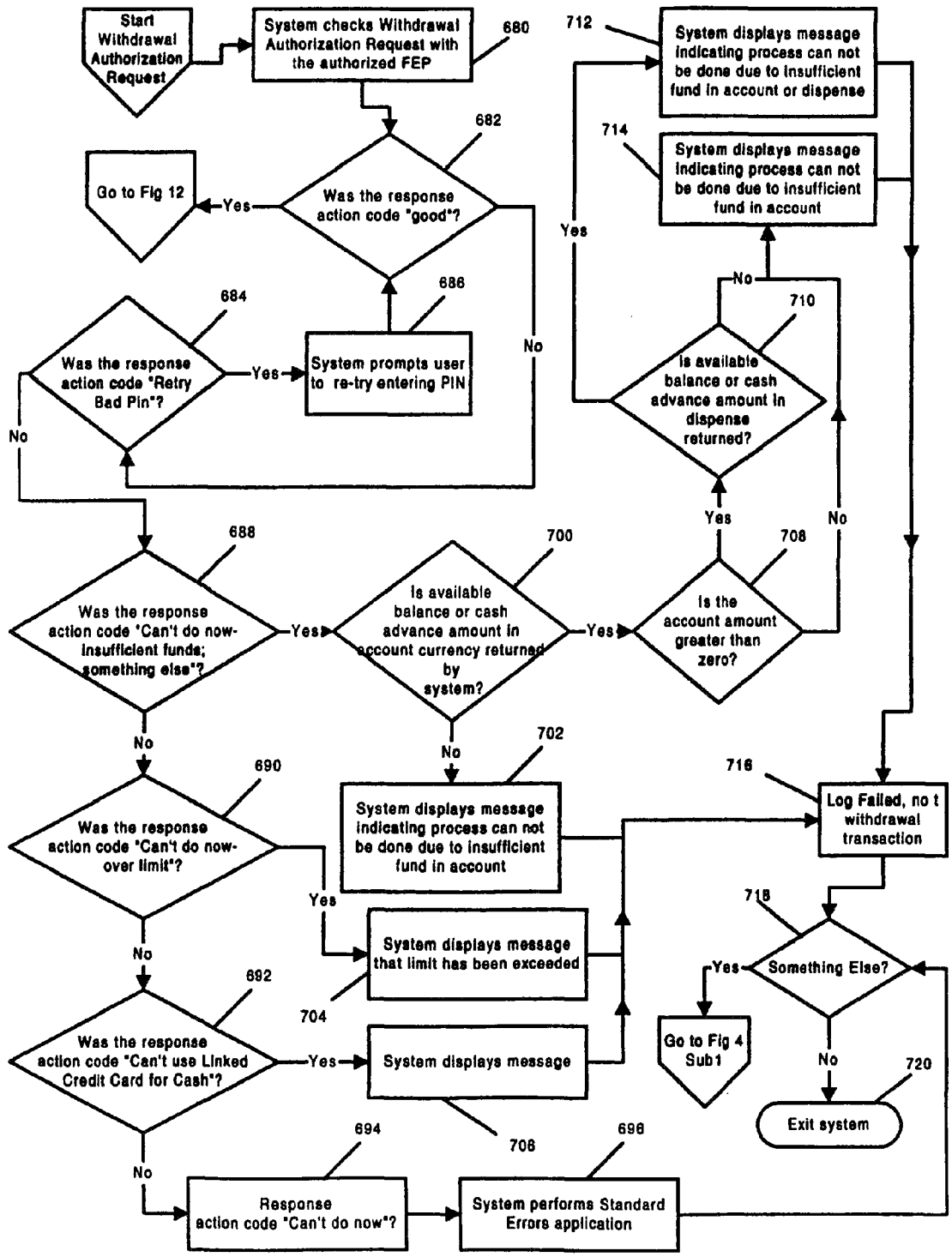
FIG. 11 diagrams the flow process for the Withdrawal Authorization Request sent to the FEP by the CAT. Shown in detail are the different types of responses that can occur from the FEP.

After the user enters the personal identification number 652, the system sends a withdrawal authorization request to the authorized FEP 654 and continues with the authorization process as shown on FIG. 11, which depicts the possible error messages and disconnection procedures if the user's account cannot enact the withdrawal. The system checks the withdrawal authorization request with the authorized FEP (FIG. 11) 680. If the response action code is "good" 682, the system continues to process dispensing the withdrawal (see FIG. 12). If the response action code is not good (error) 682, the returned code may indicate the source of the error prior to performing Standard Errors. The system may determine that the error is due to an incorrect personal identification code 684. If the personal identification code is judged to be incorrect, the system prompts the user to re-enter it 686 and the system again determines if the response action code is "good" 682.

If the response action code was not "good" and the personal identification number is not invalid 684, the system determines what caused the error response. If the response action code occurred due to insufficient funds 688, the system determines the available balance or cash advance amount in an account currency that is distributed by this system 700. If the available balance or cash advance amount is not in the account currency distributed by this system, the system displays a message indicating it cannot continue due to insufficient funds 702, and displays a transaction failed dialog box to the user 716. The system then queries the user on whether to try something else 718. If the user selects yes, the system continues to the Main Menu. If the user does not want to continue to conduct business, the system exits 720.

If the system determines that the available balance or cash advance amount is in account currency returned by the system, the system determines if the account amount is greater than zero 708. If not, the system displays a message indicating the process cannot be completed due to insufficient funds in the account 714 and continues to inform the user that the transaction cannot be completed 716. If the system determines that the amount requested is greater than zero, the system displays a message indicating that the process cannot be completed due to insufficient funds in the account 712 and continues to inform the user that the log in failed and the transaction cannot be completed 716.

If the response code was not due to insufficient funds 688, the system determines if the error was due to the withdrawal amount exceeding the limit 690. If so, the system displays a message that the limit has been exceeded 704, and continues to inform the user that the log in failed and the transaction cannot be completed 716.

If the system determines that the error was due to a response code of "Can't use Linked Credit Card for Cash" 692, then the system displays this information to the user 706 and continues to inform the user that the login failed and the transaction cannot be completed 716.

If the error was not due to a response code of any of the above, then the response code is "Can't do now" 694. The system then performs its Standard Errors application 695 and queries the user if there is to be another type of transaction 718.

Figure 12:
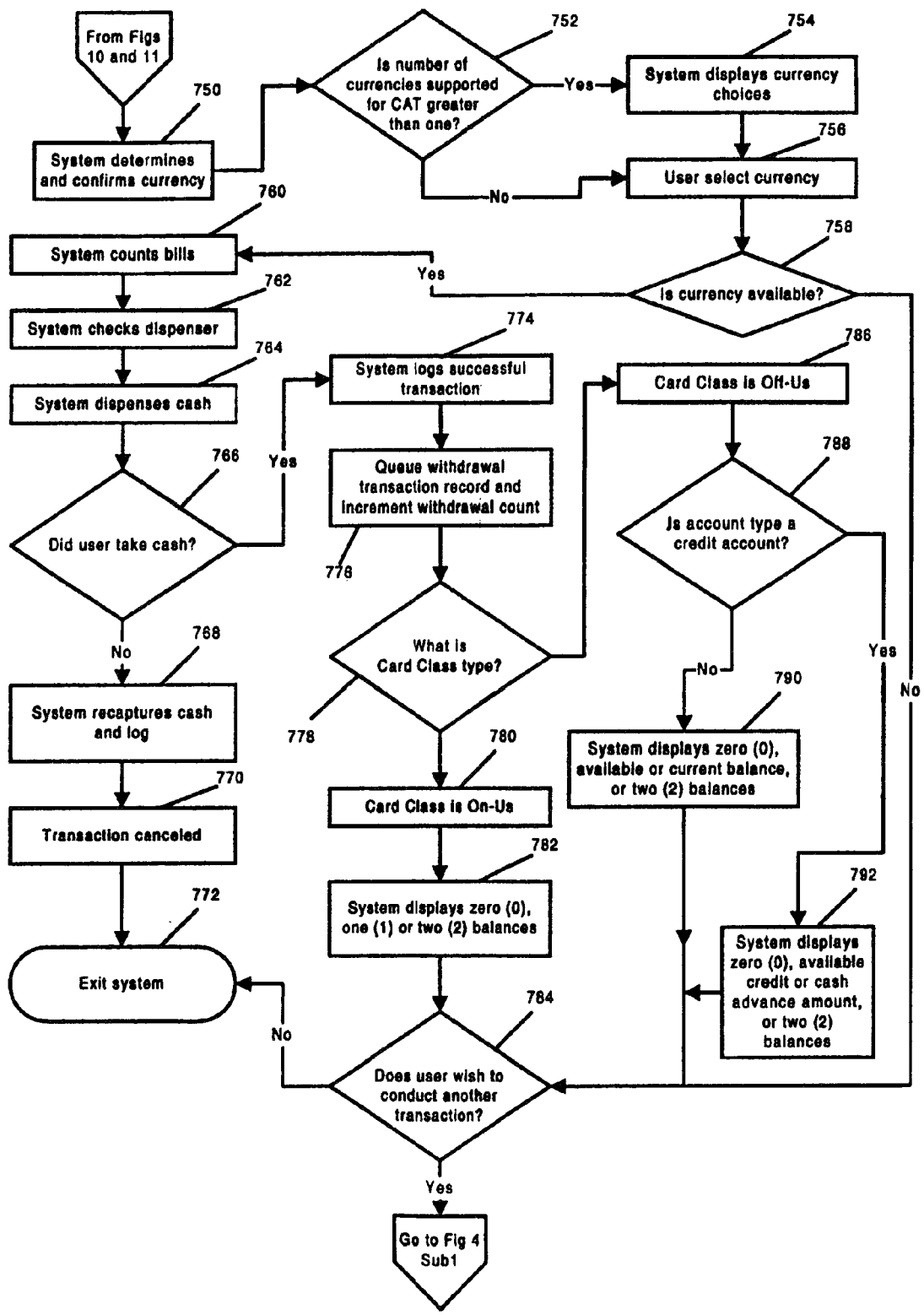
FIG. 12 is a continuation from FIGS. 10 and 11, providing a flow diagram of the withdrawal currency determination.

FIG. 12 depicts the dispensing of cash to the user. The system determines and confirms the currency 750 and then determines if the number of currencies supported for the customer activated terminal is greater than one 752. If not, the user selects the currency 756. If so, the system displays the currency choices 754, and then the user selects the currency 756.

The system then determines if any currency is available 758. If no currency is available, the system asks if the user would like to conduct another transaction 784. If yes, the system returns to the Main Menu. If no, the system exits 772.

If currency is available, the system counts the bills 760, checks the dispenser 762, and dispenses the cash 764. The system then determines if the user took the cash 766. If the user did not take the cash, the system recaptures the cash 768, cancels the transaction 770, and exits the system 772. If the user took the cash, the system logs a successful transaction 774, and queues the withdrawal transaction record 776 while verifying the withdrawal count.

The system then determines the card class 778. If the card class is On-Us 780, the system displays the zero, one, or two balances 782, and continues by prompting the user if there is to be another transaction 784. If the card class is Off-Us 786 the user determines if the account type is a credit account 788. If the account type is a credit account, the system displays either zero, the available credit or cash advance amount, or two balances 792, and then queries the user as to whether the user desires another transaction 784. If the account type is not a credit account, the system displays either a zero, the available or current balance, or two balances 790 and then queries as to whether the user desires another transaction 784.

Figure 13:
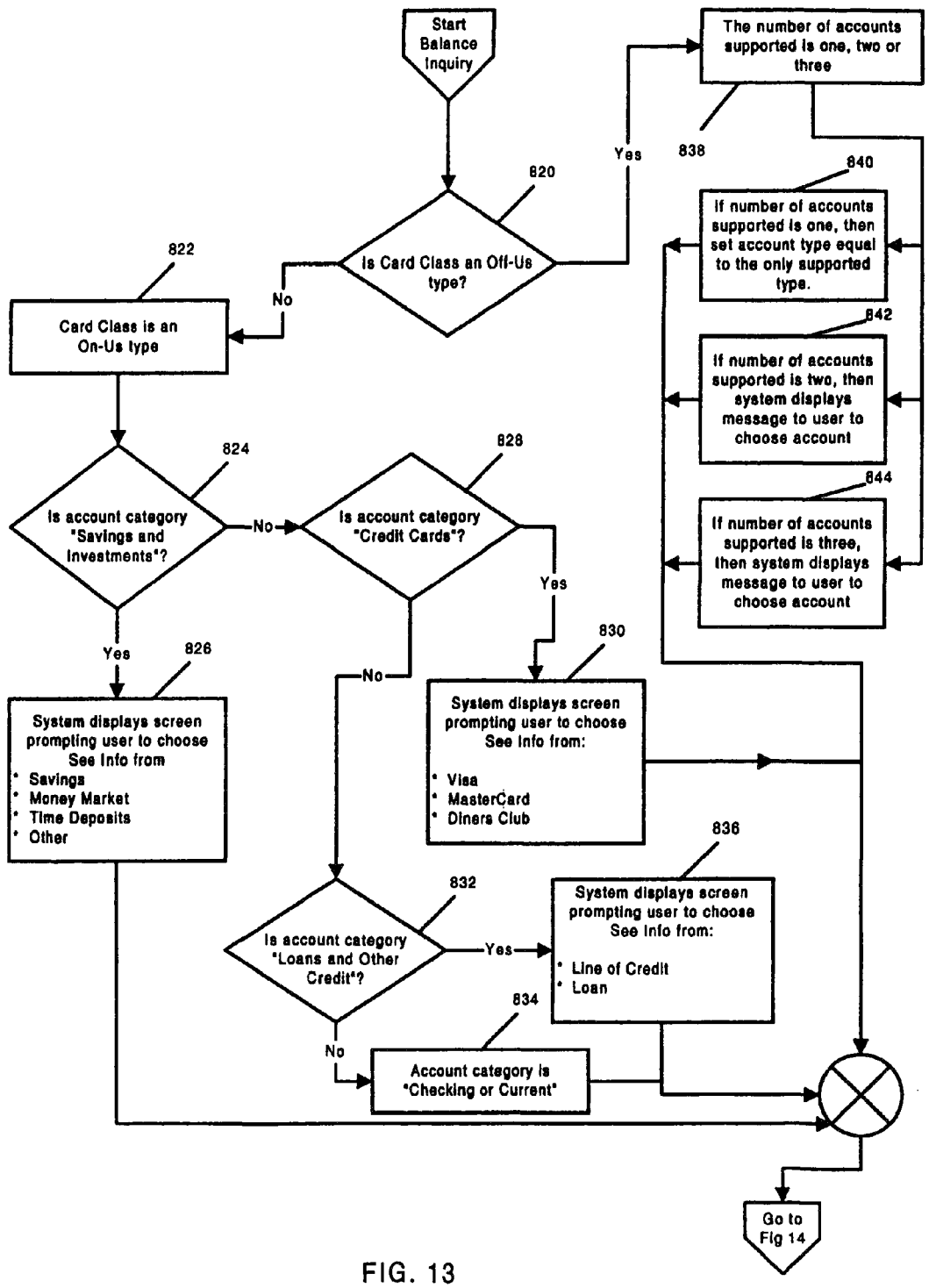
FIG. 13 is a flow diagram that outlines the initial process for the Balance Inquiry (See Info) application for an embodiment of the present invention. It describes the initial menu choices for the user.
Figure 14:
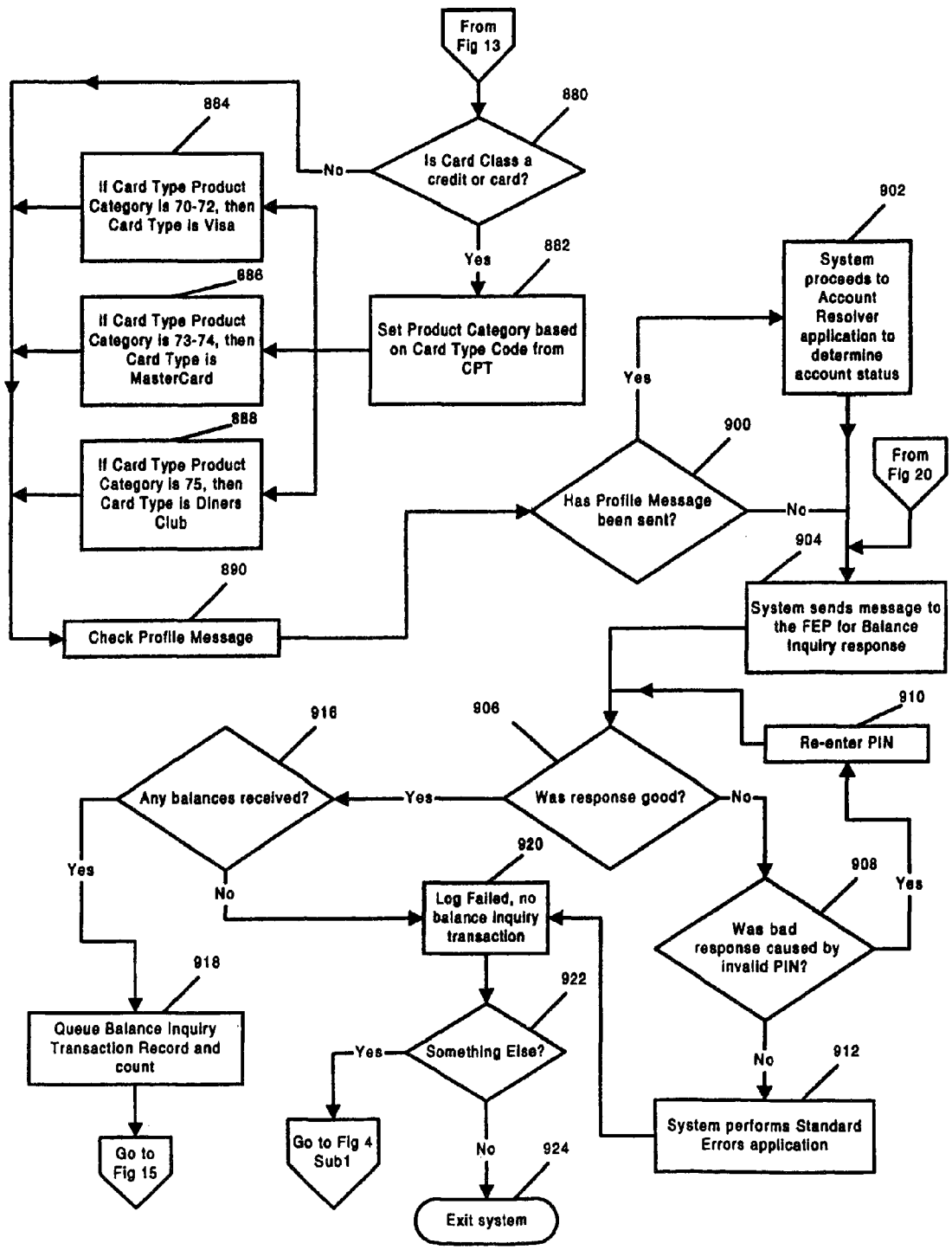
FIG. 14 is a continuation from FIG. 13 and describes the options available for users based on the card class type.
Figure 15:
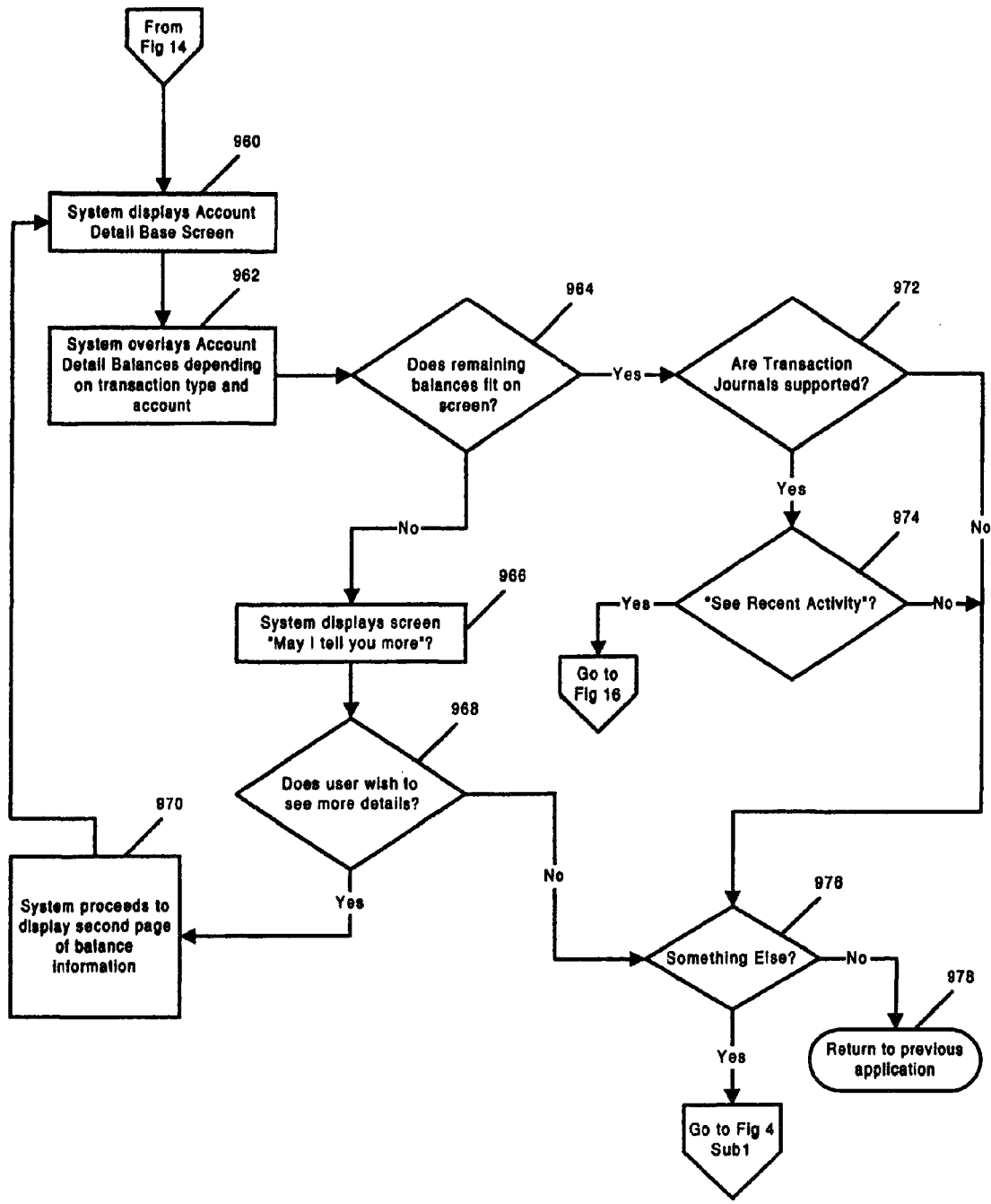
FIG. 15 is a continuation from FIG. 14, diagramming the final portions of the Balance Inquiry application and the relationship with Transaction Journal (See Recent Activity) functionality.

FIGS. 13 through 15 depict a situation in which a user begins a balance inquiry for an account. More specifically, FIG. 13 depicts the card identification and user selection of the account from which the balance inquiry is made. The user begins an inquiry with the system identifying whether or not the card class is an Off-Us type 820. If the card is an Off-Us type, the system determines the number of accounts linked to the card 838. If the card supports one account, the withdrawal information is set to the single account identified 840. If the card supports two or three accounts, the system displays a message to the user to choose from which account to make the withdrawal 842, 844.

If the card class is determined to be an On-Us type 822, then the system determines if the account category is "Savings and Investments" 824. If the account category is "Savings and Investments", the system displays a screen prompting the user to choose cash from various accounts 826 If the account category is not "Savings and Investments" the system determines if it is "Credit Cards" 828. If the category is "Credit Cards," the system displays screens prompting the user to choose cash from a variety of credit cards linked to the account 830. If the category is not "Credit Cards," the system determines if it is "Loans and Other Credit" 832. If the account is "Loans and Other Credit," the system prompts the user to choose the credit line from which to withdraw funds 836. If the account is not "Loans and Other Credit" the account category is "Checking or Current" 834.

FIG. 14 depicts the further identification of the user's type of card and the type of CAT in use. The system identifies whether or not the card class is a credit card 880. If the card is not a credit card, the system checks the profile message 890. If the card is a credit card, the system identifies the card by its card type product category 882. If the card type product category is 70 to 72 then the card is identified as Visa 884 and the system continues checking the profile message 890. If the card type product category is 73 to 74 then the card is identified as MasterCard 886 and the system continues checking the profile message 890. If the card type product category is 75 then the card is identified as Diners Club 888 and the system continues checking the profile message 890.

The system then determines if the profile message has been sent 900. If the profile message has not been sent, the system sends the message to the FEP for a balance inquiry response 904. If the profile message has been sent, the system proceeds to the Account Resolver module to determine the account status 902. Once the account status is determined, the system sends the message to the FEP 904.

The system then determines if the FEP response was good 906. If not, the system determines if the bad response was caused by an invalid PIN 908. If so, the system prompts the user to re-enter the personal identification number 910 and again checks to see if the response is good 906. If the bad response was not caused by an invalid personal identification number 908, the system performs the standard errors application 912 and responds to the user with a failed log and no balance inquiry 920.

If the response from the FEP was good 906, the system determines if any balances were received 916. If balances were received, the system queues the balance inquiry transaction record and counts 918 with the balance inquiry application. If balances were not received, the system does not provide a balance inquiry transaction 920, and determines if the user wants to attempt a different transaction 922. If so, the system returns to the Main Menu. If not, the system exits 924.

FIG. 15 depicts the process of displaying the user's balance inquiry. The system displays the account detail base screen 960, and then overlays the Account Detail balances depending on the transaction type and account 962. The system then determines if the remaining balances fit on the screen 964. If the remaining balances do not fit on the screen, the system displays a screen querying the user as to whether more information is needed 966. If the user selects to see more details 968, the system proceeds to display a second page of balance information 970 and then returns to the Account Detail Base Screen 960. If the user does not wish to see more details, the system continues to query the user as to whether the user desires another transaction 976.

If the remaining balances do fit on the screen 964, the system determines if the transaction journals are supported 972. If the transaction journals are supported, the system determines if the user wishes to see recent activity 974. If so, the system proceeds with the transaction journal application. If the user does not wish to see recent activity, the system determines if the user wishes to conduct another transaction 976.

If the Transaction journals are not supported 972, the system determines if the user wants to hold another transaction 976. If so, the system returns to the Main Menu. If the user does not want to hold another transaction, the system exits the balance inquiry application 978.

Figure 16:
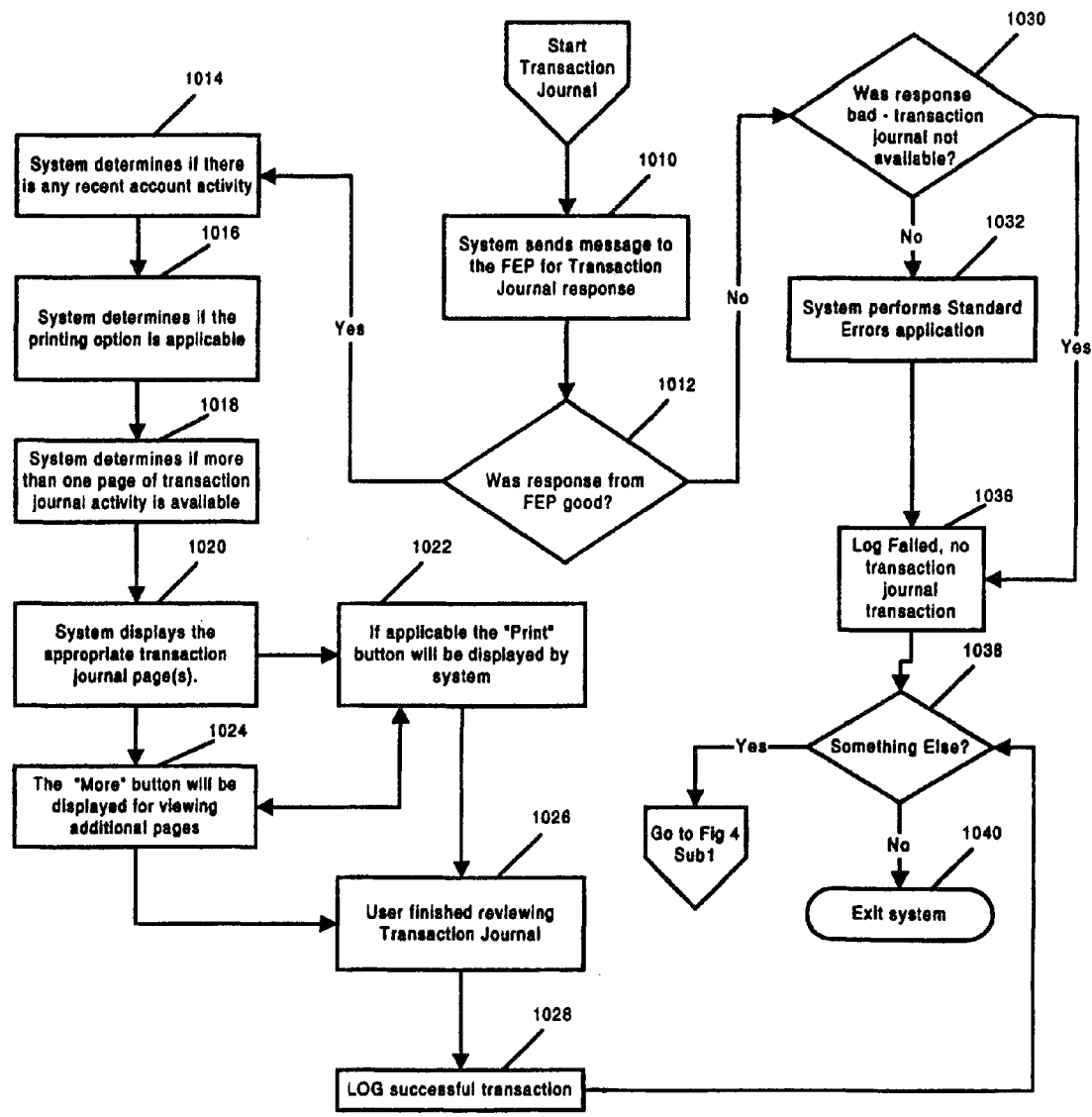
FIG. 16 is a flow diagram describing the method for the user to obtain Transaction Journal functionality in an embodiment of the present invention.

FIG. 16 depicts the system activating the transaction journal application, allowing the user to view recent account activity. The system sends a message to the FEP for a transaction journal response 1010. The system then determines if the response from the FEP was good 1012. If the response was good, the system determines if there is any recent account activity 1014. The system then determines if the printing option is applicable 1016 and then determines if more than one page of transaction journal activity is available 1018. The system then displays the appropriate transaction journal page (s) 1020. If the option is available, the print button is displayed 1022 and the system continues, allowing the user to finish viewing the transaction journal screen 1024. When the user is finished reviewing the transaction journal 1026, the system logs a successful transaction 1028 and the user can choose something else 1038. If so, the system continues to the Main Menu. If not, the system exits 1040.

If the response from the FEP is not good 1012, the system then determines if it is because the transaction journal was not available 1030. If so, the system logs a failed process, with no transaction journal display 1036, allowing the user to choose something else 1038. If the system determines that the bad FEP was not due to the unavailability of the transaction journal 1030, then the system performs a Standard Errors application 1032. The system determines the Standard Error and the transaction is terminated 1034.

The user may also transfer currency from one account to another and in many cases make payments to accounts. This process is diagrammed starting with FIG. 17. The first step in the transfer process is to determine the user's Card Class 1070. When the user's Card Class is an Off-Us, then the process determines if it is supported as diagrammed in FIG. 19. But if the Card Class is a debit card 1074, the system is enabled for a checking or current account 1076 or a savings and investment account 1080. In either case, the system displays a checking or savings screen and prompts the user to select Make a Transfer, Pay a Credit Card, Pay a Credit Line/Loan 1078. The user may select to exit the system prior to the transfer 1090.

If the card is not a debit card, then the card may be a credit card 1082, in which case the system displays a screen for linked credit cards allowing the user to select to Pay a Credit Card, Other Transfer 1084, and may select to exit the system prior to the transfer 1090. If the card class is not a debit or credit card, then the account category is a loan or other type of credit 1086, in which case the system displays a loan screen allowing the user to select among the option to Make a Transfer, Make a Transfer Payment 1088, or exit the system prior to the transfer 1090.

If the user chooses to exit the system prior to completing the transaction, the exit button 1094 prompts the system to exit 1096. If the user chooses to complete the transfer transaction, then the user selects the appropriate function that prompts the system to display the appropriate sub-menu based on the selection 1092. The sub-menu selection includes Make a Transfer 1098, Other Transfer 1100, Make a Transfer Payment 1102, Pay a Credit Card 1104, and Pay a Credit Line or Loan 1106.

Figure 18:
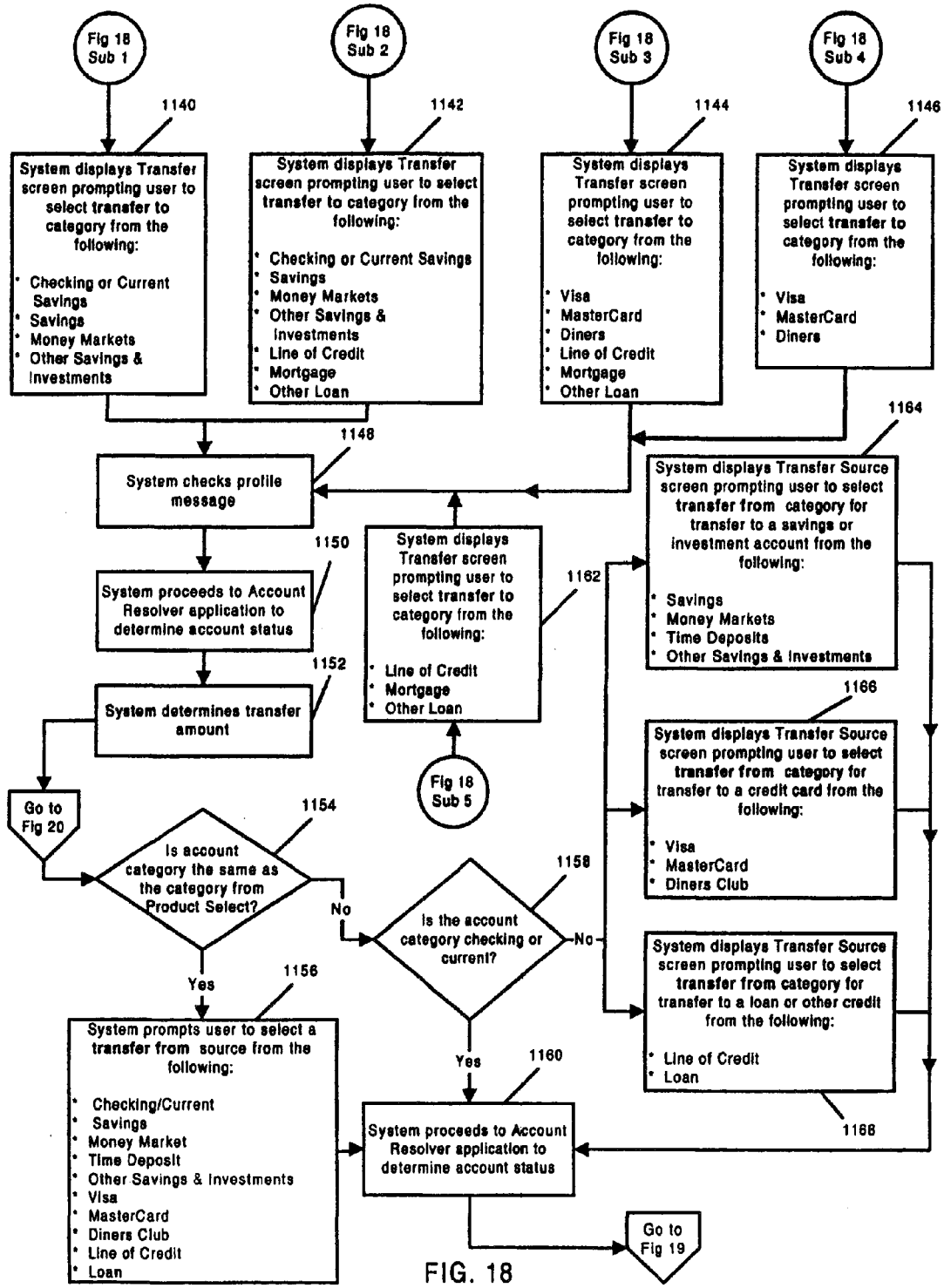
FIG. 18 is a continuation from FIG. 17 detailing the additional menu choices provided to the user from the transfer (payment) application.

The next set of screens displayed from the selection, and the pursuing flow after these screens are diagrammed on FIG. 18. When the user selects "Make a Transfer," the system displays the Transfer screen, prompting the user to select a transfer category from Checking or Current Savings, Savings, Money Markets, or Other Savings 1140. When the user selects "Other Transfer", the system displays the Transfer screen, prompting the user to select a transfer category from Checking or Current Savings, Savings, Money Markets, Other Savings and Investments, Line of Credit, Mortgage, or Other Loan 1142. When the user selects "Make a Transfer Payment," the system displays the Transfer screen, prompting the user to select a transfer category from Visa, MasterCard, Diners, Line of Credit, Mortgage, or Other Loan 1144. When the user selects "Pay a Credit Card," the system displays the Transfer screen, prompting the user to select a transfer category from Visa, MasterCard, or Diners 1146. When the user selects "Pay a Credit Line or Loan," the system displays the Transfer screen, prompting the user to select a transfer category from Line of Credit, Mortgage, or Other Loans 1162.

Once the user makes a transfer selection, the system checks the profile message 1148 and, once received, proceeds to the Account Resolver application to determine the account status 1150. If the account status is good, then the system proceeds to determine the transfer amount 1152, which is illustrated on FIG. 20. If the account category is equal to the Product Select category, then the system displays the next menu prompting the user to select a "transfer from" source from Checking/Current, Savings, Money Market, Time Deposit, Other Savings & Investments, Visa, MasterCard, Diners Club, Line of Credit, or Loan 1156. Once the user makes a selection, the system proceeds to the Account Resolver application to determine the account status 1160.

If the account category is not equal to the Product Select category, then the system determines if the account category is a checking or current account 1158. If it is, then the system proceeds to the Account Resolver application 1160. If it is not a checking or current account, then the system displays additional transfer source menus. If the user selects to transfer to a savings or investment account, then the user may select to transfer from a Savings, Money Market, Time Deposit, or Other types of linked Savings or Investment accounts 1164. If the user selects to transfer to a credit card account, then the user may select to transfer from a Visa, MasterCard, or Diners Club account 1166. If the user selects to transfer to a loan or other type of credit, then the user may select to transfer from a Line of Credit or a Loan account 1168. Once the user makes a selection from the menus described in 1164, 1166, or 1168, the system proceeds to the Account Resolver application to determine the account status 1160.

Figure 19:
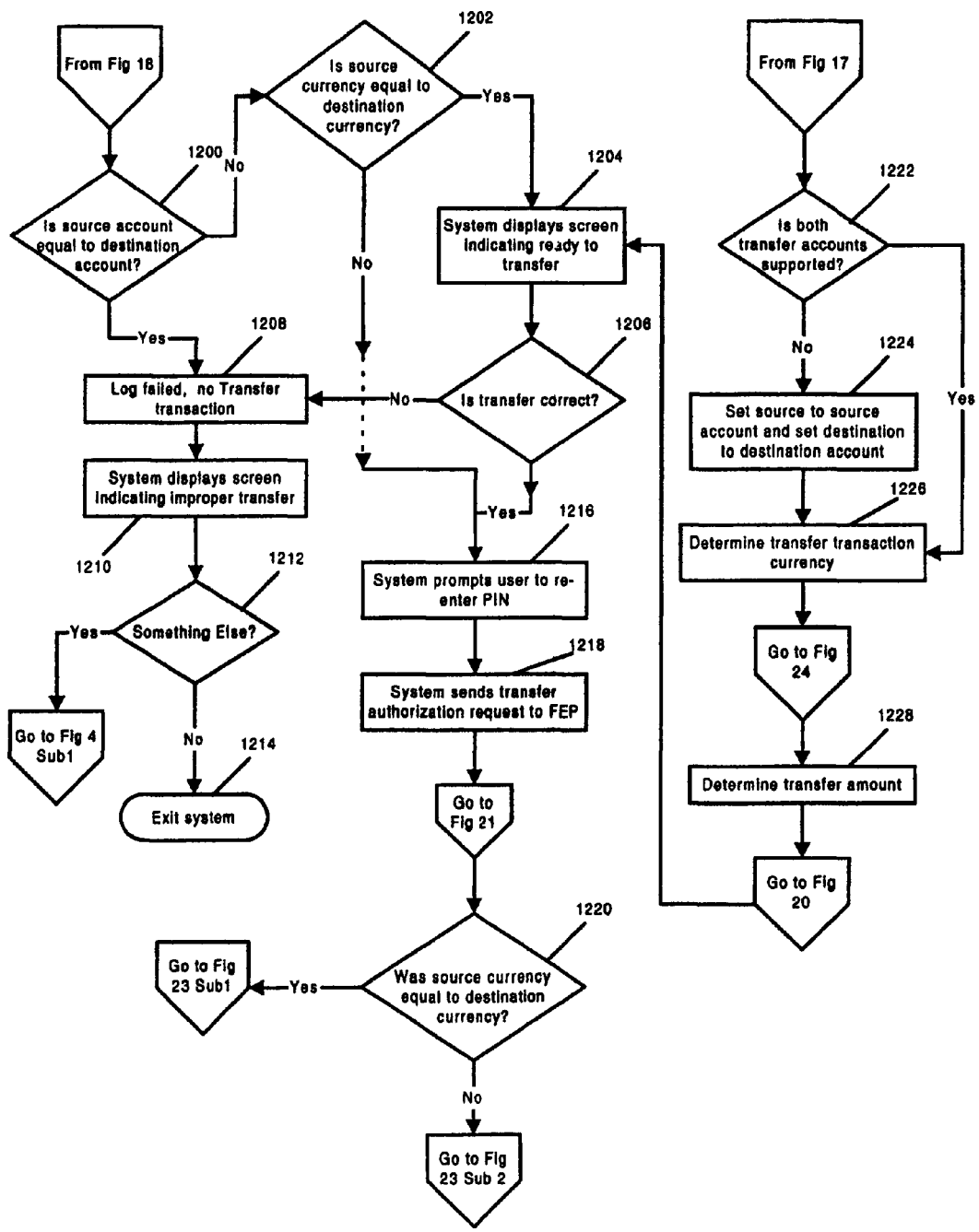
FIG. 19 is a continuation from FIG. 18 detailing the additional menu choices provided to the user from the transfer (payment) application.

Once the Account Resolve application has determined the status of the account, the system determines if the source account is equal to the destination account 1200, as diagrammed on FIG. 19. If the source account is equal to the destination account, then the transaction fails 1208, and the system displays a screen indicating that an illegal transfer has been attempted and terminated 1210. The system prompts the user to choose something else 1212, which returns the user to the Transaction Selection Main Menu, or to exit the system 1214.

If the source account is not equal to the destination account, then a transfer of currency is possible and the system determines if the currency in each account is the same 1202. If it is the same currency, the system displays a screen indicating that the screen is ready to transfer 1204, and if the transfer is correct 1206, the system prompts the user to re-enter their PIN 1216. If the transfer is incorrect 1206, then the transaction fails 1208, and the system displays a screen indicating that an illegal transfer has been attempted and terminated 1210.

Figure 21:
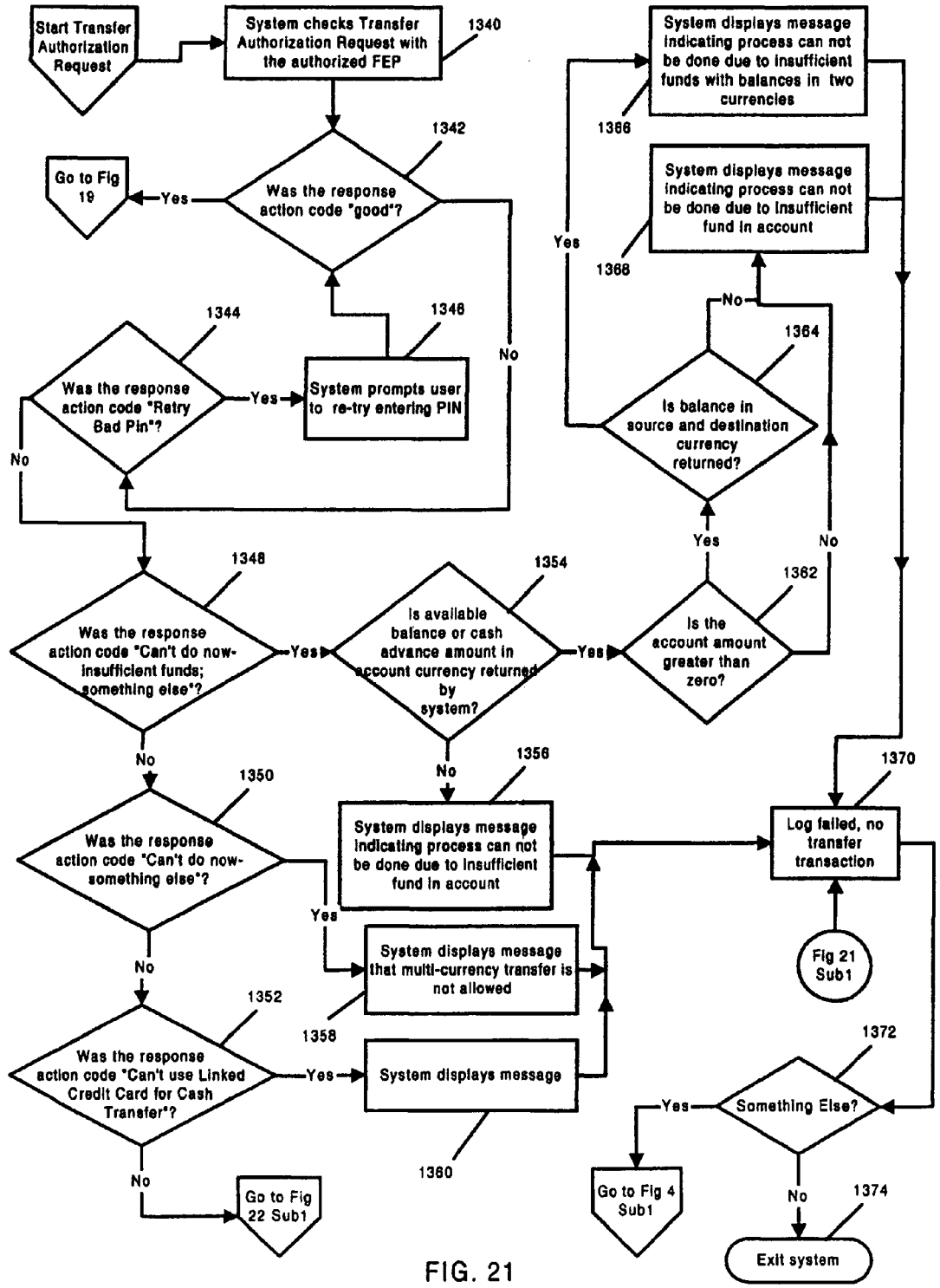
FIG. 21 diagrams the flow process for the Transfer Authorization Request sent to the FEP by the CAT. Shown in detail are the different types of responses that can occur from the FEP.

The user is also prompted to re-enter their PIN 1216 if the source currency is not equal to the destination currency 1202. After the user re-enters the PIN, the system sends a transfer authorization request to the FEP 1218, as shown in FIG. 21. If a good response is returned from the FEP, then the system proceeds to the final stages of the transfer process based on whether the source currency is equal to the destination currency 1220.

Figure 17:
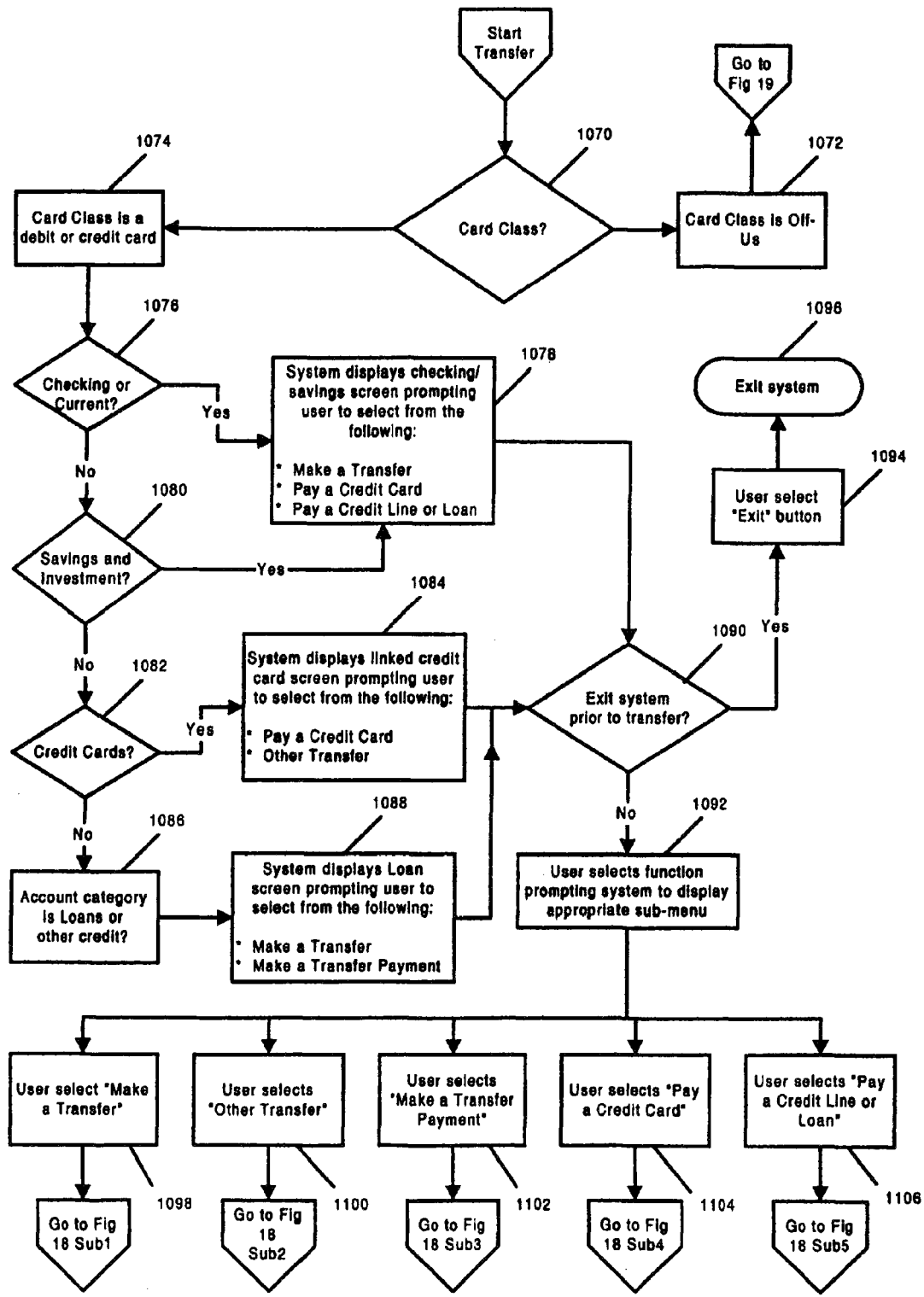
FIG. 17 is a flow diagram that outlines the initial process for the Transfer (and Payment) application for an embodiment of the present invention. It describes the initial menu choices for the user.

As was discussed in relation to FIG. 17, if the Card Class is an Off-Us type, a different process of transferring funds occurs. The first procedure is for the system, as shown in FIG. 19, to determine if both transfer accounts are supported 1222. If both accounts are supported, then the system determines the transfer transaction currency 1226, and determines if the amount transferred is allowed 1228 before displaying the screen indicating that the system is ready to transfer 1204. If both transfer accounts are not supported, then the system sets the source amount to the source account and sets the destination account 1224, and then proceeds to determining the transfer transaction currency 1226.

Figure 20:
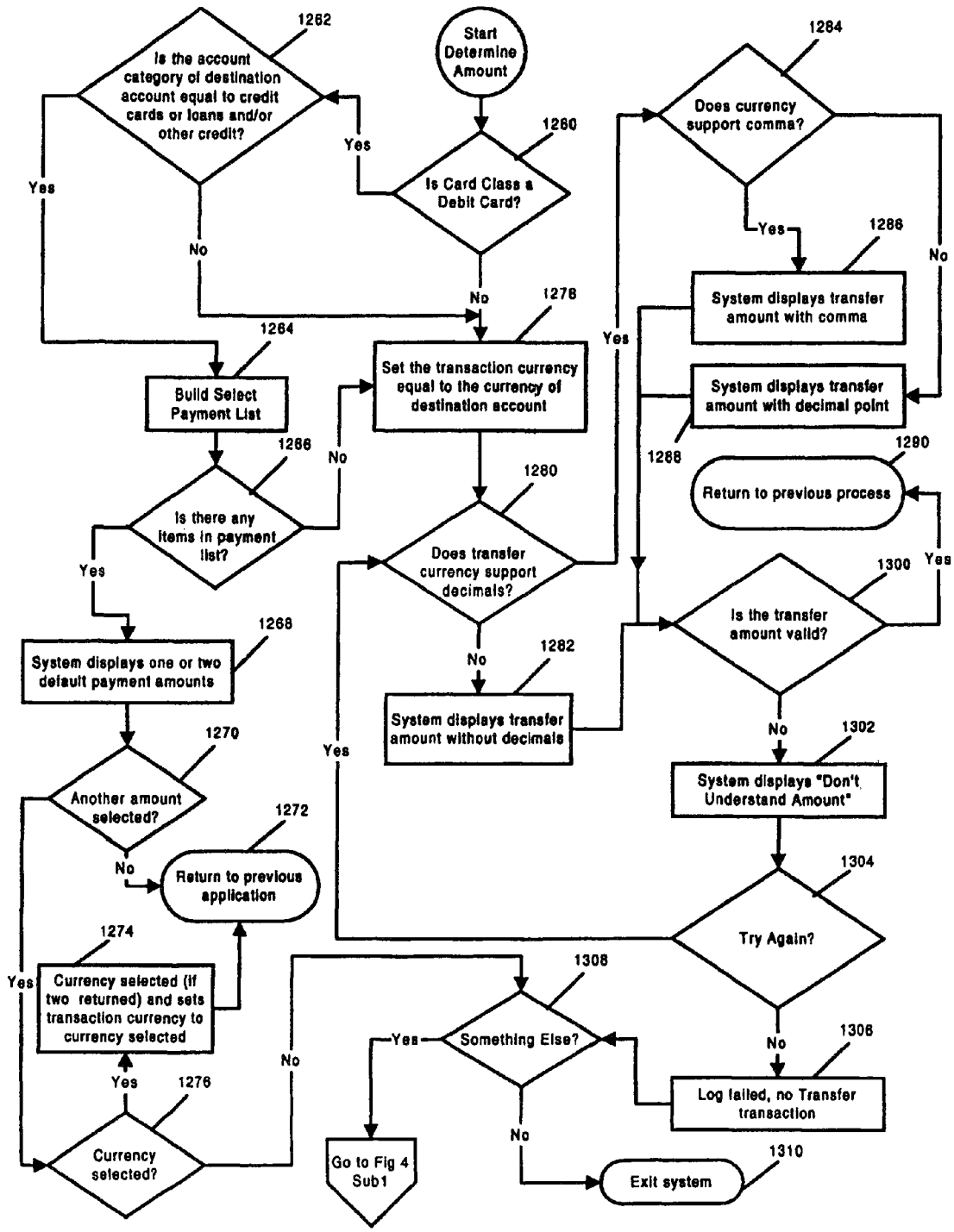
FIG. 20 diagrams the procedures for determining the amount of currency and the currency denomination to transfer from a source account to a destination account.

As indicated on FIG. 19, for a transfer transaction to proceed, the system determines and verifies the transfer amount as shown in FIG. 20. The system first determines if the Card Class is a debit card 1260, and if it is, then the system determines if the account category of the destination account is a credit card or loans and/or other credit 1262. If the account is that type, then the system sends a message to the FEP for balance inquiry and builds a Payment List 1264. It then checks whether there are any items in the payment list 1266. If there are items found, then the system displays one or two default payment amounts 1268. If another amount is selected 1270, and if the currency is selected 1276, then the system sets the transaction currency to the currency selected 1274 before returning to the previous application 1272. If there is no currency selected, then the system prompts the user to choose something else 1308, which returns the user to the Transaction Selection Main Menu, or to exit the system 1310.

When the system determines that the Card Class is not a debit card 1260, or determines that the account category of the destination account is not a credit card or loans and/or other credit 1262, or if there are no items in the payment list 1266, then the system sets the transaction currency equal to the currency of the destination account 1278. The system checks if the transfer currency supports decimals 1280, and if does not, the system displays the transfer amount without decimals 1282 and checks if the transfer amount is valid 1300. If the transfer currency supports decimals, it then checks if the currency supports commas 1284. If yes, the system displays the transfer amount with the comma 1286, and checks if the transfer amount is valid 1300. If the system does not support commas, then the system displays the transfer amount with the decimal point only 1288 and proceeds to determine if the transfer amount is valid 1300. When the transfer amount is valid, then the system has completed the determine amount portion of transfer and returns to the transfer application 1290.

When the transfer amount is not valid, the system displays a message that the system does not understand the amount 1302, and prompts the user to try again 1304. If the user chooses to try again, the system returns to determining if decimals are supported. If the user chooses not to try again, then the system logs that the Transfer transaction has failed 1306, and allows the user to return to the Transaction Selection Main Menu or exit the system.

As indicated on FIG. 19, the system sends transfer authorization requests to the FEP waiting for a response 1340, as shown in FIG. 21. If the response action code was good 1342, the system returns to the transfer process in FIG. 19 and determines currency type. If the response action code was other than good, then the response can be from different action codes. If the returned response action code is "Retry Bad Pin" 1344, then the system prompts the user to retry entering the PIN 1346, and when successfully entered, returns the system back to checking for another transfer authorization request from the FEP 1342.

When the FEP determines there is insufficient funds in an account, the returned response action code is "Can't do now-insufficient funds: something else?" 1348, and the system attempts to return the available account balance or cash advance amount 1354. If the system does not return a balance, then there are no funds or insufficient funds in the account, and the system displays a message indicating that the process can't be done due to insufficient funds in the account 1356. If the system returns the available account balance or cash advance amount 1354, and if the account source amount is greater than zero 1362, and if the system returns the balance source and destination currency 1364, then the system displays a message indicating the process can't be performed due to insufficient funds with balance in two currencies 1366. If the system does not return the balance source and destination currency 1364, then the system displays a message indicating the process cannot be done due to insufficient funds in the source account 1368. If the account source amount is not greater than zero 1362, then the system simply displays a message indicating the process cannot be completed due to insufficient funds in the source account 1368. In all of the described cases above, the log fails with no transfer transaction occurring 1370, and the user is prompted to select something else 1372, or exit the system 1374.

Another type of response from the FEP is that a multi-currency transfer can't be performed. If so, the system displays "Can't do now—something else?" 1350, and a message appears indicating that multi-currency transfer is not allowed 1358. The log fails with no transfer transaction occurring 1370. Another response from the FEP may be that the user can't use linked credit cards for cash transfer 1352. If so, the system displays "Can't use linked credit cards for cash transfer" 1360. The log fails with no transfer transaction occurring 1370.

Figure 22:
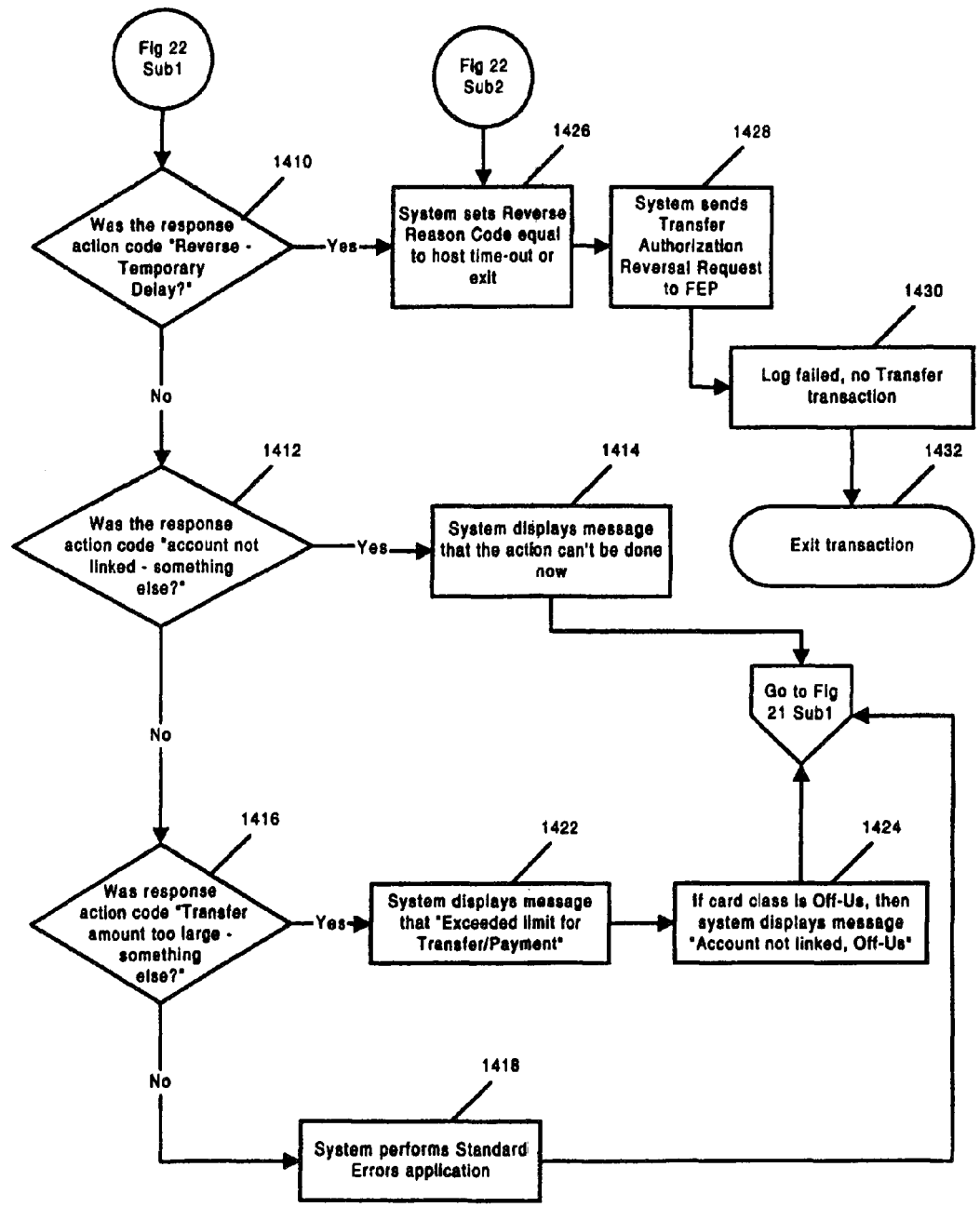
FIG. 22 is a continuation of FIG. 21 that diagrams the flow process for the Transfer Authorization Request sent to the FEP by the CAT. Shown in detail are the additional types of responses that can occur from the FEP and the Reversal Reason Code.

Additional descriptions of FEP transfer responses are shown on FIG. 22. If the response action code indicated "Reverse-Temporary Delay" 1410, then the system sets the reverse reason code equal to the host time-out or exit 1426. The system sends a Transfer Authorization Reversal Request to the FEP 1428. Due to the reversal, the log fails, canceling the transfer transaction 1430, and exits the transaction 1432.

If the FEP transfer responds that the account is not linked 1412, then the system displays a message that the "Action can't be done at this time" 1414. If the response from the FEP is that the transfer amount is too large 1416, then the system display a message "Exceeded limit for Transfer/Payment" 1422, and if the card class is an Off-Us, then the system displays a message that the "Account is not linked, Off-Us" 1424. Finally, a default response from the FEP is for the system to perform a Standard Errors application 1418. In these cases, the log fails with no transfer transaction occurring (FIG. 21) 1370, and the user is prompted to select something else 1372, or exit the system 1374.

Figure 23:
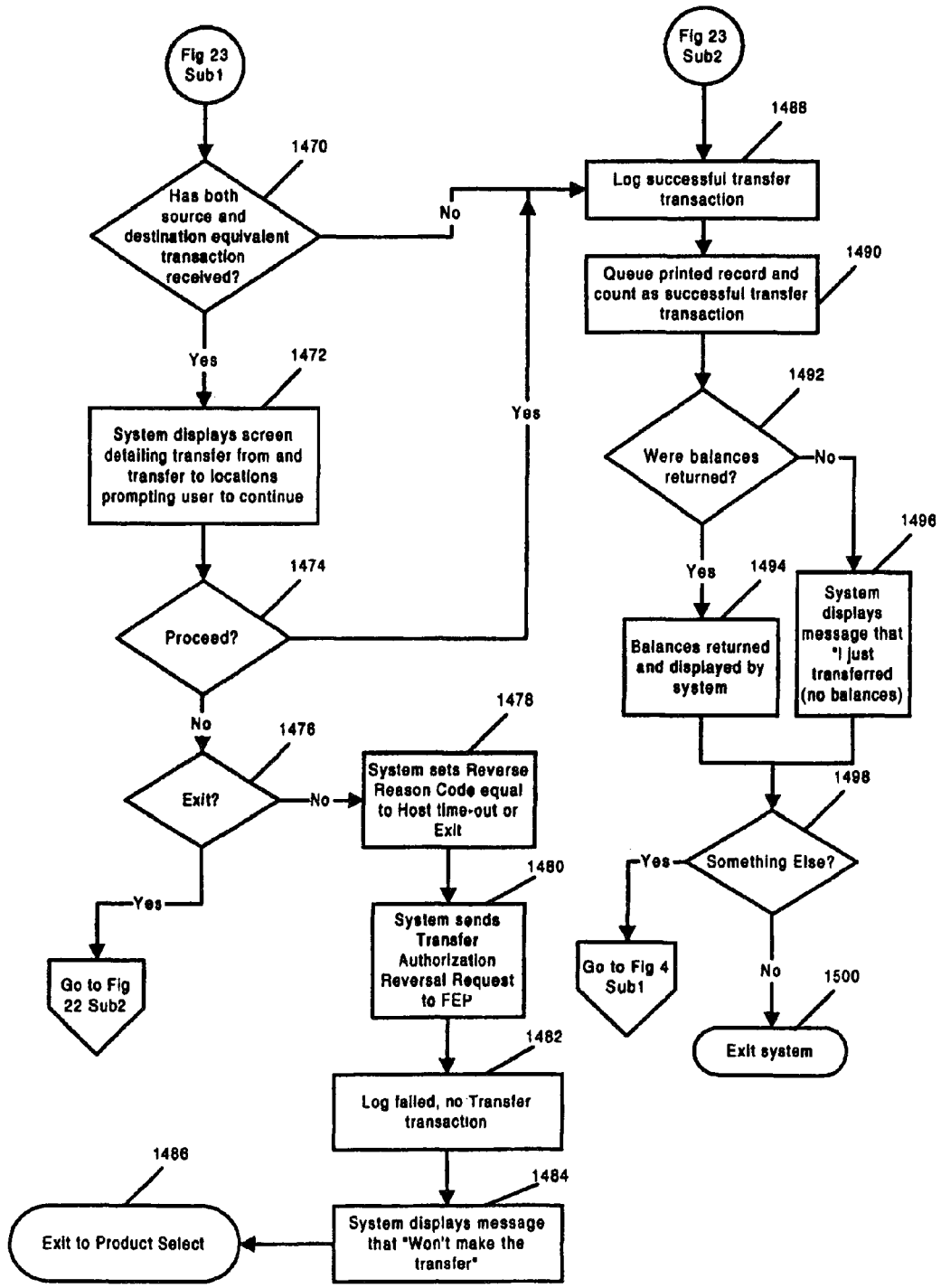
FIG. 23 is a flow diagram outlining the confirm and resulting balances procedures for a transfer request.

In FIG. 23, the transfer transaction flow is illustrated from the point of determining if the source currency is equal to the destination currency. When the source and destination currency are not the same, then equivalent transfers must be determined 1470. If this transaction data is not received, it indicates that the source and destination accounts are the same currency and the transfer proceeds. However, when both source and destination equivalent transaction amounts are received by the system, then the system displays a screen detailing the transfer from and transfer to locations 1472. The user is allowed to choose to proceed 1474; if yes, the transfer transaction is successful, if no, the system prompts the user to exit 1476. If the user chooses not to exit, then the system sets the Reverse Reason Code equal to the Host time-out or Exit 1478, and the system sends a transfer authorization reversal request to the FEP 1480. The Log fails with no Transfer transaction occurring 1482, and the system displays a message that the transfer will not occur 1484. The system then exits to Product Select 1486.

When the source and destination account's currency are the same, then the system proceeds with logging a successful transfer transaction 1488. The system queues the printed record and counts it as a successful transfer transaction 1490. The system then determines if balances were returned from the FEP 1492, and if so, the balances are returned and displayed or printed 1494. If no balances are returned the system displays the message "I just transferred (no balances)" 1496. The user is prompted to select something else 1498, or exit the system 1500.

Figure 24:
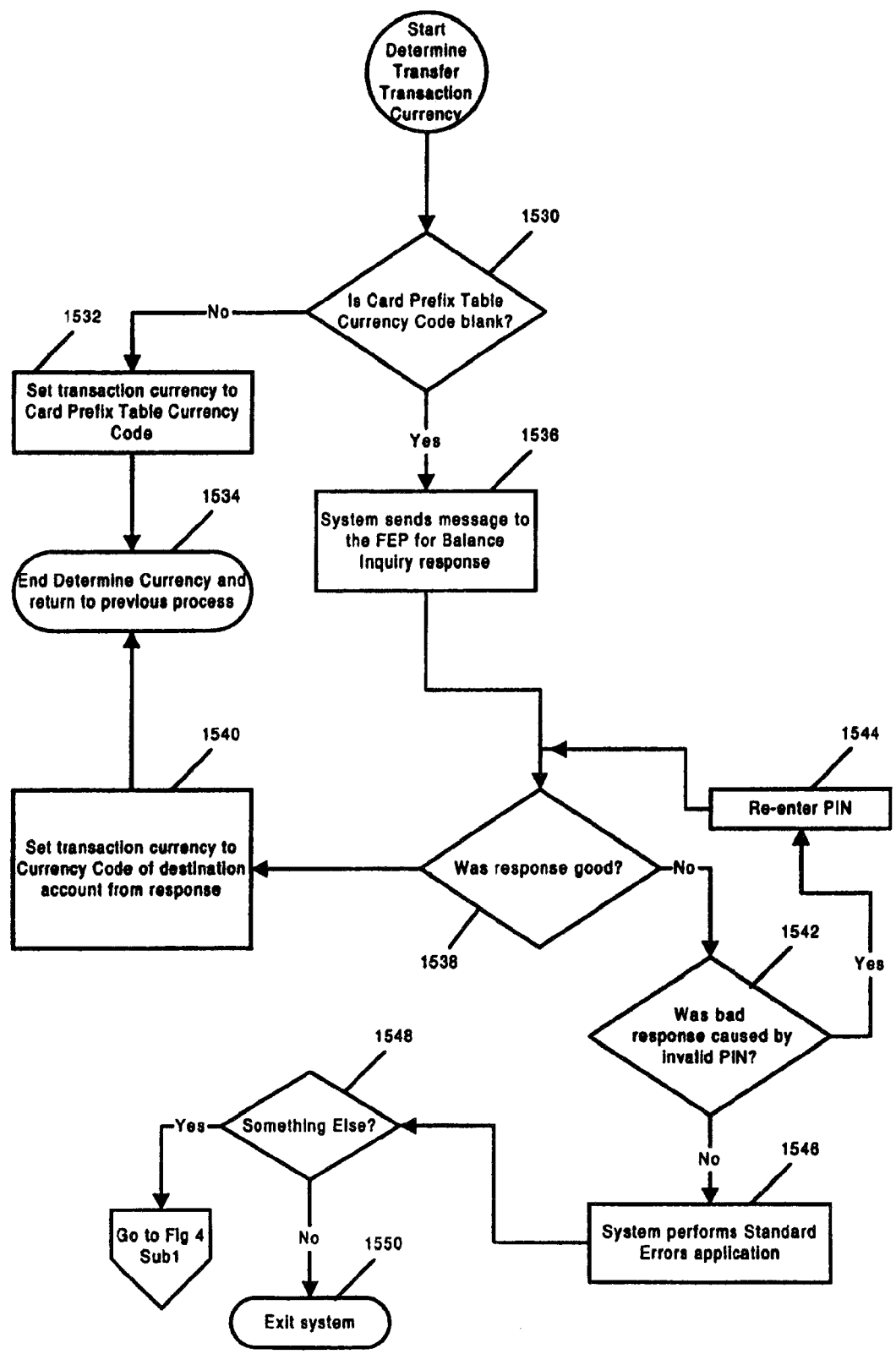
FIG. 24 is a flow diagram outlining the procedure for determining the transfer transaction currency code.

The process of determining transfer transaction currency is diagrammed in FIG. 24. The system first checks whether the card prefix table currency code is blank 1530. If it is not blank, then the system sets the transaction currency to the card prefix table currency code 1532, which ends the process of determining currency 1534. If the card prefix table currency code is blank, then the system sends a message to the FEP for a balance inquiry response 1536. If the response is good 1538, then the system sets the transaction currency to the currency code of the destination account based on the response 1540. If the balance inquiry response was not good (error), then the system determines if the response as caused by an invalid PIN 1542. If so, the system prompts the user to re-enter their PIN 1544, and the system resends the message to the FEP with the new PIN. If the error was not caused by an invalid PIN, then the system performs the Standard Errors application 1546 to determine the error source. The user is prompted to select something else 1548, or exit the system 1550.

FIGS. 25A and 25B provide in table format a listing of the different types of transactions supported, by product category and functionality. The table provides a breakdown of the different account types, such as Checking or Current, Savings and Investments, Loans and Other Credit, and Credit Cards (linked and standalone types) and provides the sub-menu choices along the left column. The transactional functionality of each application, such as balance inquiry, transaction journal, withdrawal, and transfer/payment is determined with a yes, no, or N/A (not available) response.

FIGS. 26A, 26B and 26C provide in table format a listing of the "Balance" functionality for different types of transactions. A balance is returned for many different types of transactions, including Balance Inquiry. Other transactions provide balance statements on the screen, such as for transfers or withdrawals, depending on the specific balance requested. The first column provides the product name (account type). The second column provides the field name representing the types of balances available. The screen text column provides the wording that is displayed on the screen. The last four columns represent transactions, and the check marks indicate a balance response for that transaction and account.

FIG. 27 is a chart that provides information as to the balance and print availability for Off-Us card types. The left column is the account or category name; the balance column lists the different balance types for accounts; and the print column shows the printed text on the receipt.

FIGS. 28A and 28B provide in table format a listing of the "Balance" printing functionality for different types of transactions. A balance is returned for many different types of transactions, including Balance Inquiry. Other transactions provide balance statements on the screen, such as for transfers or withdrawals, depending on the specific balance requested. The first column provides the product name (account type). The second column provides the field name representing the types of balances available. The printer record text column provides the wording that is printed when requested. The last four columns represent transactions, and the check marks indicate a printed balance response for that transaction and account.

FIG. 29 is a table listing the transaction journal transaction functions. This list of functions is available when a user selects to "See Recent Activity" from Balance Inquiry. If the user selects one of these functions, the system displays the information, usually in a table form, on the screen for viewing.

FIG. 30 provides a representation of Graphical User Interface (GUI) screens for the Product Select Main Menu 1560, the Withdrawal Selection Menu 1562, and the See Recent Activity (Transaction Journal) display 1564.

FIG. 31 is a representation of the printed record for different types of transactions. A sample cash withdrawal record for On-Us debit and credit cards is shown as element 1566. Element 1568 is a sample cash withdrawal record for Off-Us card classes. Element 1570 is a sample inquiry record for On-Us debit and credit cards, and element 1572 is a sample inquiry record for Off-Us card classes. A sample transaction journal record for On-Us debit and credit cards is shown as element 1574.

FIG. 32 is a continuation of FIG. 31 representing different printed records. Element 1576 shows a sample transfer record for On-Us debit and credit cards and element 1578 is a sample transfer record for Off-Us card classes. Element 1580 is a sample customer service referrals record for On-Us debit and credit cards and element 1582 is for Off-Us card classes.

What is claimed is:

1. A computer-implemented method for providing multi-regional user access to perform financial transactions, the method comprising:
   receiving, by at least one front-end processor from a terminal in one of a plurality of regions, instructions for a financial transaction;
   identifying, by the terminal, a non-local user account type based on a user's input received at the terminal,
     wherein the account type is non-local when the user is accessing a terminal in a region other than the user's local region;
   establishing, by the terminal and the front-end processor, a real-time interactive session directly between the user at the terminal and the front-end processor via the common interface;
   receiving, by the front-end processor via the common interface, an entry by the user of an access code at the terminal;
   providing verification to the terminal, by the front-end processor, of the access code entered by the user at the terminal;
   receiving, by the front-end processor via said common interface, a selection by the user at the terminal for a transaction request, wherein the transaction request is selected from a list of transactions common to each of the regions and presented to the user at the terminal by the front-end processor via the common interface; and
   performing, by the front-end processor via the common interface, the requested transaction for the user at the terminal.

2. The method of claim 1, wherein identifying the non-local user account type further comprises:
   transmitting, by the terminal to the front-end processor, a request for user access-specific information; and
   transmitting, from the front-end processor to the terminal, the requested user access-specific information.

3. The method of claim 1, wherein the list of transactions further comprises obtaining cash, obtaining information, transferring funds, making payments, reviewing recent activity, and obtaining customer service.

4. The method of claim 1, wherein identifying the non-local user account type based on the user's input further comprises identifying the non-local user account type based at least in part on the user's input via inserting a card into a card reader of the terminal.

5. The method of claim 4, wherein identifying the non-local user account type based on the user's input further comprises identifying an expiration date for the card and comparing the expiration date to a current date.

6. The method of claim 1, further comprising printing a record regarding the selected transaction in the selected language for the user at the terminal.

7. The method of claim 1 further comprising:
   transmitting, by the terminal to the front-end processor, a request for user account balance information; and
   transmitting, from the front-end processor to the terminal, the requested user account balance information.

8. The method of claim 1, wherein the user's selection of a language is based in part on the user's input via inserting a card into a card reader of the terminal.

9. The method of claim 1, further comprising selecting a currency for the financial transaction based upon the region of the terminal.

10. A computer system for providing multi-regional user access to perform financial transactions, comprising:

at least one front-end processor;

a plurality of terminals deployed within each of a plurality of regions and coupled to the at least one front-end processor, wherein the front-end processor serves as exclusive arbitrator of transaction acceptance and fulfillment for each of the terminals within each of the regions, wherein each of the terminals sharing a common interface with the front-end processor for all of the regions, wherein each of the terminals identifies a non-local user account type based on a user's input received at the terminal and establishes a real-time interactive session directly between the user at the terminal and the front-end processor for the region via the common interface;

wherein the front-end processor is programmed to:

receive, via the common interface, the user's entry of an access code at the terminal in response to a prompt of the user for the access code at the terminal by the front-end processor via the common interface and verifying by the front-end processor the entered access code;

receive, via the common interface, a selection by the user at the terminal for a transaction request, wherein the transaction request is selected from a list of transactions common to each of the regions and presented to the user at the terminal by the front-end processor via the common interface; and perform, via the common interface, the requested transaction for the user at the terminal in the currency of the region of the terminal.

11. The system of claim 10, wherein each region is a business-defined region.

12. The system of claim 10, wherein the terminal is a personal computer.

13. The system of claim 10, wherein said non-local user account type is a line of credit.

14. The system of claim 10, wherein said non-local user account type is a mortgage.

15. The system of claim 10, wherein said non-local user account type is a loan.

16. The system of claim 10, wherein said non-local user account type is a credit card account.

17. The system of claim 10, wherein said non-local user account type is a checking account.

18. The system of claim 10, wherein said non-local user account type is a savings account.

19. The system of claim 10, wherein said non-local user account type is a money market account.

20. The system of claim 10, wherein said non-local user account type is a time deposit account.

21. The system of claim 10 wherein said non-local user account type is an investment account.

* * * * *